US010233068B2

(12) United States Patent
Bazoberry

(10) Patent No.: US 10,233,068 B2
(45) Date of Patent: *Mar. 19, 2019

(54) SYSTEM AND METHOD FOR PRESERVING WINE AND OTHER PERISHABLE SUBSTANCES

(71) Applicant: BOSTON WINE DEVICES, LLC, Chestnut Hill, MA (US)

(72) Inventor: Carlos Fernando Bazoberry, Chestnut Hill, MA (US)

(73) Assignee: Boston Wine Devices, LLC, Chestnut Hill, MA (US)

(*) Notice: Subject to any disclaimer, the term of this patent is extended or adjusted under 35 U.S.C. 154(b) by 13 days.

This patent is subject to a terminal disclaimer.

(21) Appl. No.: 15/057,117

(22) Filed: Feb. 29, 2016

(65) Prior Publication Data
US 2016/0207752 A1 Jul. 21, 2016

Related U.S. Application Data

(63) Continuation-in-part of application No. 14/211,137, filed on Mar. 14, 2014, now Pat. No. 9,272,834.
(Continued)

(51) Int. Cl.
*B67D 1/04* (2006.01)
*C12H 1/12* (2006.01)
(Continued)

(52) U.S. Cl.
CPC .............. *B67D 1/0412* (2013.01); *A23L 2/44* (2013.01); *A23L 3/3445* (2013.01);
(Continued)

(58) Field of Classification Search
CPC .......................... B65D 81/28; B65D 81/2084; B65D 81/2076; B65D 81/245; B65D 81/266;
(Continued)

(56) References Cited

U.S. PATENT DOCUMENTS

| 718,163 A | 1/1903 | Sherrard |
| 3,343,701 A | 9/1967 | Mahoney |

(Continued)

FOREIGN PATENT DOCUMENTS

| EP | 2727993 A1 | 4/2014 |
| FR | 2756347 | 5/1998 |

(Continued)

OTHER PUBLICATIONS

European Patent Office, Supplemental Search Report, EPO Form 1503, Application No. EP14767408, dated Sep. 15, 2016, European Patent Office, Munich, 2 pages.
(Continued)

*Primary Examiner* — Paul R Durand
*Assistant Examiner* — Robert Nichols, II
(74) *Attorney, Agent, or Firm* — Thomas P. O'Connell; O'Connell Law Firm

(57) ABSTRACT

A volumetric displacement preservation system for preserving a volume of flowable substance in a vessel. A fluid exchange structure has a stopper, a head portion, and a fluid exchange valve with a first condition where fluid inlet and exhaust pathways in the fluid exchange structure are simultaneously closed and a second condition where the fluid inlet and exhaust pathways are simultaneously opened by conduit joining portions in the fluid exchange valve. A chamber retains a volume of preservative gas and is connected to the fluid inlet pathway externally to the vessel. The preservative gas can be supplied from the chamber into the vessel through the fluid inlet pathway as liquid is exhausted through the fluid exhaust pathway. The chamber can be replenished from preservative gas displaced from the vessel in a reverse volumetric displacement process or from preservative gas supplied by a preservative gas production canister.

21 Claims, 34 Drawing Sheets

Related U.S. Application Data

(60) Provisional application No. 61/781,477, filed on Mar. 14, 2013.

(51) Int. Cl.
    *B67D 1/12*          (2006.01)
    *A23L 3/3445*       (2006.01)
    *A23L 2/44*         (2006.01)
    *B65D 81/20*        (2006.01)
    *C12H 1/14*         (2006.01)
    *B67D 1/08*         (2006.01)

(52) U.S. Cl.
    CPC ..... *B65D 81/2076* (2013.01); *B65D 81/2084* (2013.01); *B67D 1/1252* (2013.01); *C12H 1/12* (2013.01); *C12H 1/14* (2013.01); *B67D 1/0885* (2013.01)

(58) Field of Classification Search
    CPC .... B65D 1/095; B65D 83/094; B65D 21/086; B65D 1/32; B65D 83/0094; B65D 83/0055; B67D 1/0885; B67D 1/1252; B67D 1/0412; A23L 3/3445; A23L 2/44; A47K 5/1211; C12H 1/12; C12H 1/14; B65B 31/047; A47G 19/183; A61M 11/008; B05B 11/04; B05B 11/3029; B05B 11/3032; B05B 11/3033; B05B 11/3035; B05B 11/303
    USPC ..... 222/386.5, 152, 399, 484, 206; 215/311, 215/260
    See application file for complete search history.

(56) References Cited

U.S. PATENT DOCUMENTS

| | | | |
|---|---|---|---|
| 3,883,043 | A | 5/1975 | Lane |
| 4,392,578 | A | 7/1983 | Fipp et al. |
| 4,473,174 | A | 9/1984 | Heuser |
| 4,477,477 | A | 10/1984 | Arter |
| 4,595,121 | A | 6/1986 | Schultz |
| 4,684,033 | A | 8/1987 | Marcus |
| 4,702,396 | A | 10/1987 | Gwiazda |
| 4,756,436 | A * | 7/1988 | Morita .................. A23L 3/3436 215/228 |
| 4,838,442 | A * | 6/1989 | Merry .................. B65D 51/244 206/525 |
| 4,856,680 | A | 8/1989 | Sitton |
| 4,984,711 | A | 1/1991 | Ellis |
| 5,049,106 | A | 9/1991 | Kim et al. |
| 5,139,179 | A | 8/1992 | Cecil |
| 5,240,853 | A | 8/1993 | Copeland et al. |
| 5,458,165 | A | 10/1995 | Liebmann, Jr. |
| 5,566,730 | A | 10/1996 | Liebmann, Jr. |
| 5,667,110 | A | 9/1997 | McCann et al. |
| 6,607,100 | B2 * | 8/2003 | Phelps ............... B01D 53/0446 222/1 |
| 7,051,901 | B2 | 5/2006 | Hickert |
| 7,096,677 | B2 | 8/2006 | Luzaich et al. |
| 7,232,354 | B2 | 6/2007 | Olson et al. |
| 7,395,949 | B2 | 7/2008 | Ehret et al. |
| 7,712,637 | B2 | 5/2010 | Lambrecht |
| 8,033,431 | B2 | 10/2011 | Sommerfield et al. |
| 8,141,746 | B2 | 3/2012 | Lambrecht |
| 8,225,959 | B2 | 7/2012 | Lambrecht |
| 8,490,832 | B2 | 7/2013 | Lambrecht |
| 8,640,919 | B2 | 2/2014 | Lambrecht |
| 8,746,502 | B2 | 6/2014 | Lambrecht |
| 9,061,878 | B2 | 6/2015 | Lambrecht |
| 9,139,412 | B2 | 9/2015 | Lambrecht |
| 2007/0039977 | A1 | 2/2007 | Donaldson |
| 2007/0181602 | A1 | 8/2007 | Taradalsky |
| 2008/0170963 | A1 | 7/2008 | Cantrell |
| 2008/0272085 | A1 * | 11/2008 | Laporta ............. B65D 39/0052 215/296 |
| 2009/0095776 | A1 | 4/2009 | Turner et al. |
| 2009/0218365 | A1 | 9/2009 | Taradalsky et al. |
| 2010/0012612 | A1 | 1/2010 | Miyanaga |
| 2011/0204093 | A1 | 8/2011 | Lee |
| 2012/0214371 | A1 | 8/2012 | Pisor |
| 2013/0153685 | A1 | 6/2013 | Drobot et al. |
| 2014/0158557 | A1 * | 6/2014 | Dolan .................. B65D 79/005 206/0.7 |
| 2014/0224833 | A1 | 8/2014 | Lambrecht |
| 2014/0312059 | A1 | 10/2014 | Dziuk et al. |

FOREIGN PATENT DOCUMENTS

| | | |
|---|---|---|
| JP | 2006327683 A | 12/2006 |
| JP | 2007169113 A | 7/2007 |
| KR | 10-2012-0002672 | 1/2012 |

OTHER PUBLICATIONS

United States Patent & Trademark Office, International Search Report and Written Opinion, PCT/ISA/220, Application No. PCT/US2017/019694, dated May 19, 2017, U.S. Patent & Trademark Office, Alexandria, VA.

* cited by examiner

SYSTEM AND METHOD FOR PRESERVING WINE AND OTHER PERISHABLE SUBSTANCES

RELATED APPLICATION

This application is a continuation-in-part of application Ser. No. 14/211,137, filed Mar. 14, 2014, which claimed priority to Provisional Application No. 61/781,477, filed Mar. 14, 2013, the entirety of each being incorporated herein by reference.

FIELD OF THE INVENTION

The present invention relates generally to the preservation of consumable liquids and other substances, such as wine. More particularly, disclosed herein are a system and method for preserving wine and other perishable substances by volumetric displacement between a flowable substance within an inner volume of a vessel and a preservative gas to permit a dispensing of a desired volume of the substance, such as wine, from the vessel and the concomitant introduction of the preservative gas into the inner volume of the vessel to prevent degradation of a volume of flowable substance remaining in the open inner volume of the vessel.

BACKGROUND OF THE INVENTION

Preserving wines and other beverages and perishable substances once they have been initially exposed to air has long been a problem that has confronted consumers who want to utilize only a portion of the substance leaving the rest for a later occasion. Indeed, many inventors have sought to provide systems and methods for preserving retained liquids and other substances against degradation by exposure to air. Unfortunately, most attempts of the prior art have failed without expensive and complicated pressurized systems.

For instance, due to its chemical composition, wine is susceptible to degradation by an increase in acidity and spoiling when it is exposed to a significant amount of undesired oxygen. Indeed, to the experienced palate, oxygen typically produces a negative impact on the taste of wine within hours of oxygen exposure.

Some methods of the prior art are relatively simple. For instance, many will seek to limit a wine's exposure to the oxygen content in ambient air by merely re-corking an opened wine bottle and placing the bottle in a cool place or refrigerating the corked container. Although not overly difficult, such methods are of extremely limited effectiveness and reliability.

Other methods have involved adding matter to the inner volume of the vessel to replace the volume of dispensed wine. Solids, liquids, and gases have been inserted into the open inner volumes of wine bottles and other vessels seeking to displace oxygen-rich air from the vessel to limit the amount of oxygen that is in the bottle available to interact with and deteriorate the wine. Some such methods have involved inserting stones, glass beads, and other solid objects into the vessel. Others seek to displace or prevent the introduction of ambient air into the vessel by injecting oils or inert gases into the inner volume of the vessel. Still other inventors have sought to confront degradation by filling a bladder inserted into the open inner volume and inflating the bladder to fill the inner volume as the liquid exits the vessel. Each such method and system disadvantageously tends to introduce undesirable contaminants, such as dirt, oil, bacteria, fungi, and other contaminants, to the inner volume of the vessel. The introduction of such contaminants runs directly counter to the goal of preserving the integrity of the contained wine or other substance and can itself contribute to spoilage while also representing a hazard to the health of the consumer.

One system involving an expandable bladder is disclosed in the Sep. 26, 1967 U.S. Pat. No. 3,343,701 to Mahoney for a Sealing and Exhausting Device for Containers. There, Mahoney teaches a system where a replacement stopper is inserted into a vessel. An expansible bulb is retained by a tube that passes through the stopper, and an exhaust tube passes through the stopper to permit the passage of air from the inner volume of the vessel as the bulb is expanded. Even beyond the undesirable insertion of a foreign object into what may be a very valuable bottle of wine, for instance, the system taught by Mahoney and many similar systems of the prior art still leave at some unadulterated, high-oxygen air in the vessel. Moreover, an unintentional depressurization of the bulb, such as by leaking or another malfunction, will leave the contents of the vessel fully exposed to ambient air and consequent degradation.

Further inflatable bladder systems are taught, for instance, in U.S. Pat. No. 4,392,578 to Fipp et al. and in U.S. Pat. No. 7,051,901 to Hickert. Fipp et al. teach a system similar to that disclosed by Mahoney where a stopper plug retains an expansible bladder, and a venting valve permits air within a bottle to be exhausted. A pump is provided to inflate the bladder. Fipp et al. go further than Mahoney by providing an inert gas reservoir for dispensing an inert gas into the vessel prior to the inflation of the bladder so that a protective layer is formed atop the retained liquid. In Hickert, air can be forced into an expansible bladder by a hand pump to cause the level of wine in the bottle to rise to contact the stopper. Again, however, the systems and methods of Fipp et al. and Hickert entail the insertion of a foreign bladder into direct contact with the vessel's contents, and the performance of the system hinges largely on the bladder's resistance to deflating.

Yet another system seeking to preserve the perishable contents of a bottle through an expansible bladder within the bottle is disclosed in U.S. Pat. No. 7,395,949 to Ehret et al. Here, the filling of the bladder is sought to be achieved by volumetric displacement where a pressure differential created when wine or other liquid is exhausted through a borehole in a stopper tends to draw ambient air into a second borehole in the stopper to inflate an expandable volumetric displacement balloon disposed within the inner volume of the bottle. Still, one must expose the contents of the vessel to the inserted balloon, which is designed to be repeatedly. Furthermore, operation of the Ehret et al. system hinges on ability to inflate the balloon and the balloon's continued ability to stay inflated even when unattended.

Other methods of the prior art involve evacuating air from the inner volume of the wine bottle or other vessel thereby to attempt to create and maintain a vacuum. Under such methods, a minimized amount of oxygen is left in the vessel so that, ideally, degradation of the vessel's contents is correspondingly minimized. However, inducing and maintaining a sufficient vacuum has typically proven challenging. Furthermore, an indication of when adequate vacuum pressure has been achieved or lost is normally nonexistent. Consequently, a user cannot be confident that the contents of the vessel are being preserved even when the process is initiated, and, even if a proper vacuum is initially created, the contents can spoil during the very time that the user believes they are being protected.

Other systems are known where an inflatable bladder is avoided by the direct injection of an inert gas under pressure into the inner volume of the vessel. Such systems can simultaneously achieve a dispensing of the liquid contents of the vessel and an insertion of the preservative gas as the pressurized gas displaces the liquid through an exhaust port. Some of these types of systems involve piercing the original cork with a trocar or other piercing device to create one or more fluid pathways between the inner volume of the vessel and the environment. One example of such a system is set forth in U.S. Pat. No. 4,984,711 to Ellis. There, a hollow screw with first and second passageways is driven through the cork. Gas under pressure is injected from a canister through one passageway, and liquid is discharged through the second passageway. This and similar approaches can be challenging and expensive to implement and maintain such that they are outside the budget of many individual consumers. Indeed, users are often left to guess whether they have injected a sufficient volume of the inert gas. Where too little gas is injected, the wine or other substance is inadequately protected. Consequently, many are tempted to inject an extra burst of gas, which is wasteful and dangerous. Indeed, where too much gas is injected, excess pressure can accumulate in the bottle leading to leakage or, worse, dangerous bursting of the bottle. Further, the gas canisters are typically disposable thereby contributing to environmental waste.

The prior art also discloses systems where an entire bottle or multiple bottles are maintained in a container that can be filled with preservative gas. An example of such a system is shown and described in U.S. Pat. No. 4,856,680 to Sitton. Under the teachings of the '680 patent, a chamber is provided to receive an opened bottle, and pressurized inert gas is introduced to preserve the contents of the bottle and, when sufficiently pressurized, to dispense liquid from the bottle through a fluid dispensing conduit. Properly maintained, such systems do insulate the contents of the bottle from excess exposure to oxygen-rich ambient air, but the acquisition and maintenance costs and complexities leave the systems accessible only to restaurants and similar businesses and a limited set of individuals.

In view of the foregoing, it will be appreciated that, despite the many attempts of the prior art to provide devices, systems, and methods to preserve the quality of wine and other substances in an opened vessel, there remains a real need for a system and method for preserving wine and other perishable substances that overcomes the notable disadvantages that remain. In particular, the state of the art makes clear that there is a need for a preservation system and method that is highly effective and reliable not only on initial application but also during use and storage. It is similarly clear that there is a need for a preservation system and method that is elegant and uncomplicated in application and use such that confident, safe, and effective use can be achieved by neophyte and expert users alike. Still further, there is a need for a preservation system and method that can be affordable not only during initial manufacture and sale but also during continued usage. It is also clear that the provision of such a system and method that does not require the insertion of foreign objects into the inner volume of the vessel would be advantageous structurally and hygienically.

SUMMARY OF THE INVENTION

With a knowledge of the state of the art, the present inventor set forth with the basic object of providing a system and method for preserving wine and other perishable substances that is highly effective and reliable not only on initial application but also during use and storage. Embodiments of the preservation system and method disclosed herein also seek to be elegant and uncomplicated in application and use such that confident and effective use can be achieved by neophyte and expert users alike. Another object of particular embodiments of the invention is to provide a system and method for preserving wines and other substances that is safe during operation and storage, including by avoiding a need for pressurized gas supplies and the risks attendant thereto. A related object of the invention is to provide a system and method for preservation of substances in vessels that does not require the insertion of foreign objects, such as inflatable bladders and the like, into the inner volume of the vessel thereby to avoid the structural and hygienic disadvantages deriving therefrom. Yet another object of the invention is to provide a preservation system and method for wines and other perishable substances that can be affordable not only during initial manufacture and sale but also during continued usage.

These and further objects, advantages, and details of the present invention will become obvious not only to one who reviews the present specification and drawings but also to those who have an opportunity to experience an embodiment of the system and method for preserving wines and other perishable substances disclosed herein in operation. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects, one potential embodiment of the volumetric displacement preservation system seeks to preserve a volume of flowable substance, such as a wine, in an open inner volume of a vessel, such as a wine bottle. The volumetric displacement preservation system can include a fluid exchange structure with a stopper for creating a sealing engagement with the vessel. A fluid exhaust pathway is disposed in the fluid exchange structure with a first end in fluidic communication with the open inner volume of the vessel and a second end in fluidic communication exterior to the vessel. The fluid exhaust pathway has an open condition where fluid can pass through the fluid exhaust pathway and a closed condition where fluid substantially cannot pass through the fluid exhaust pathway. A fluid inlet pathway is disposed in the fluid exchange structure with a first end in fluidic communication with the open inner volume of the vessel and a second end in fluidic communication exterior to the vessel. The fluid inlet pathway has an open condition where fluid can pass through the fluid inlet pathway and a closed condition where fluid substantially cannot pass through the fluid inlet pathway. A chamber, such as a flexible and compressible bladder, has an inner volume for retaining a volume of preservative gas and an orifice for dispensing the preservative gas from the chamber. A fluidic connection is provided for fluidically connecting the orifice of the chamber to the second end of the fluid inlet pathway with the chamber retained external to the vessel.

Under this construction, when the fluid exhaust pathway and the fluid inlet pathway are in closed conditions, fluid cannot be exhausted through the fluid exhaust pathway and fluid cannot be received through the fluid inlet pathway. However, when the fluid exhaust pathway and the fluid inlet pathway are in open positions, liquid can be dispensed from the open inner volume of the vessel through the fluid exhaust pathway and preservative gas can be drawn from the chamber and into the open inner volume of the vessel through the fluid inlet pathway in volumetric displacement of the liquid exhausted through the fluid exhaust pathway. Consequently, the open inner volume of the vessel can be progressively filled by preservative gas to prevent or minimize the degradation of the remaining contents of the vessel.

In embodiments of the system, the fluidic connection for fluidically connecting the orifice of the chamber to the second end of the fluidic inlet pathway can take the form of a valve connector sealingly engaged with the orifice of the chamber and a valve connector sealingly engaged with the second end of the fluid inlet pathway. The valve connector sealingly engaged with the orifice of the chamber can have a closed condition when not engaged with another valve connector.

It is also contemplated that the fluid exchange structure can have a fluid exchange valve with a first condition where the fluid exhaust pathway and the fluid inlet pathway are substantially closed and a second condition where the fluid exhaust pathway and the fluid inlet pathway are open. To carry this forth in one example, the fluid exchange valve, which can be pivotable between the first and second conditions, can have a conduit joining portion that completes and opens the fluid exhaust pathway when the fluid exchange valve is in the second condition and a separate conduit joining portion that completes and opens the fluid inlet pathway when the fluid exchange valve is in the second condition. Moreover, the fluid exchange valve can include a portion that substantially seals the fluid exhaust pathway when the fluid exchange valve is in the first condition and a portion that substantially seals the fluid inlet pathway when the fluid exchange valve is in the first condition. Manifestations of the invention can have a fluid exchange structure with a head portion that retains the stopper, and the fluid exchange valve can have a base portion that is pivotable in relation to the head portion between the first and second conditions.

Embodiments of the system can have a fluid exchange valve with first and second conduit joining portions that cooperate to complete and open the fluid exhaust pathway when the fluid exchange valve is in the second condition. Those first and second conduit joining portions can meet within the fluid exchange valve distal to the first and second conduit joining portions such that wine or another substance exhausted through the fluid exhaust pathway can pass through the first and second conduit joining portions and mix prior to exhaustion from the fluid exchange valve, such as through a nozzle of the fluid exchange valve that is disposed distal to the first and second conduit joining portions.

Particular embodiments of the system can have the conduit joining portion that completes and opens the fluid inlet pathway when the fluid exchange valve is in the second condition take the form of a channel in the base portion of the fluid exchange valve, and that channel can complete the fluid inlet pathway when the fluid exchange valve is in the second condition. In such embodiments, first and second conduit joining portions in the base portion can again cooperate to complete and open the fluid exhaust pathway when the fluid exchange valve is in the second condition, and the conduit joining portion that completes and opens the fluidic inlet pathway can be disposed at least partially between the first and second conduit joining portions that cooperate to complete and open the fluid exhaust pathway.

Manifestations of the system can have a head portion of the fluid exchange structure with a pathway corresponding in shape and size to a shape and size of the base portion of the fluid exchange valve, and the base portion of the fluid exchange valve can be pivotably received by the pathway. Where the fluid exchange valve is pivotable between the first condition and the second condition and has first and second ends, a first lever arm can be fixed to pivot with the first end of the fluid exchange valve and a second lever arm can be fixed to pivot with the second end of the fluid exchange valve. The first and second lever arms can be generally aligned longitudinally with the stopper and the bottle or other vessel in which it is disposed when the fluid exchange valve is in the second condition, and the first and second lever arms can be generally orthogonal to the stopper and the bottle or other vessel in which it is disposed when the fluid exchange valve is in the first condition. Under such constructions and where the first and second lever arms are substantially equal in size and shape, the lever arms can support and stabilize a retained vessel.

A further possibility under the disclosed system is for the chamber to be disposed within a substantially rigid shell, which can protect the chamber against, for example, inadvertent damage or compression. The shell can be retained relative to the vessel and the remainder of the system by, for example, opposed first and second wings that project from the shell for engaging the vessel.

It is contemplated that the chamber can be replenished in a reverse volumetric displacement process by supplying a displacement liquid into the open inner volume of the vessel through the fluid exhaust pathway to volumetrically displace preservative gas back into the chamber. It is further possible to replenish the chamber through an inert gas production canister. The inert gas production canister can have an open inner volume for retaining a volume of air and an oxygen absorbing material for removing oxygen from the air. The inert gas production canister could have a resiliently compressible shell, a lid slidably engaged with a shell, or some other construction.

A method for volumetric displacement preservation for preserving a volume of flowable substance in an open inner volume of a vessel as taught herein can be founded on providing even a basic volumetric displacement preservation system as first described above. Then, the stopper can be applied to the vessel, and the orifice of the chamber can be connected to the second end of the fluid inlet pathway. The vessel can be disposed in a dispensing condition, and the fluid exhaust pathway and the fluid inlet pathway can be disposed in open conditions. With that, a volume of the flowable substance can be dispensed from the open inner volume of the vessel through the fluid exhaust pathway, such as under the force of gravity. Simultaneously, a volume of preservative gas will be drawn into the open inner volume of the vessel through the fluid inlet pathway in volumetric displacement of the liquid exhausted through the fluid exhaust pathway.

The step of disposing the vessel in a dispensing condition can, but need not, happen before the step of disposing the fluid exhaust pathway and the fluid inlet pathway in open conditions. When the dispensing step is complete, the fluid exhaust pathway and the fluid inlet pathway can be adjusted to closed conditions, potentially while the vessel is in a dispensing condition to avoid the introduction of air into the inner volume of the vessel.

When the preservative gas in the chamber is at least partially exhausted, the chamber could be disposed of or replenished. In one practice of the invention, the chamber can be replenished in a reverse volumetric displacement process for harvesting preservative gas from the inner volume of a vessel and into the inner volume of the chamber. To do so, a volume of displacement liquid can be supplied into the open inner volume of the vessel through the fluid exhaust pathway with the fluid exhaust pathway and the fluid inlet pathway in open conditions to cause preservative gas within the open inner volume of the vessel to be volumetrically displaced into the chamber through the fluid inlet pathway. In another practice of the invention, the chamber can be replenished with gas from an inert gas production canister. The inert gas production canister can have an open inner volume for retaining a volume of air and an oxygen absorbing material for removing oxygen from the air.

Where the inert gas production canister has a resiliently compressible shell, the step of replenishing the chamber can include the step of squeezing the compressible shell to transfer preservative gas from the compressible shell to the chamber. Where the inert gas production canister has a lid slidably engaged with a shell for enabling a change in the open inner volume of the shell, the step of replenishing the chamber can include the step of sliding the lid relative to the shell to reduce the open inner volume of the inert gas production canister to transfer preservative gas from the compressible shell to the chamber. In either case, the process can further include the steps of allowing air into the open inner volume of the inert gas production canister and waiting a period of time to permit the air to be reduced in oxygen content.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The system and method for preserving wine and other perishable substances disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
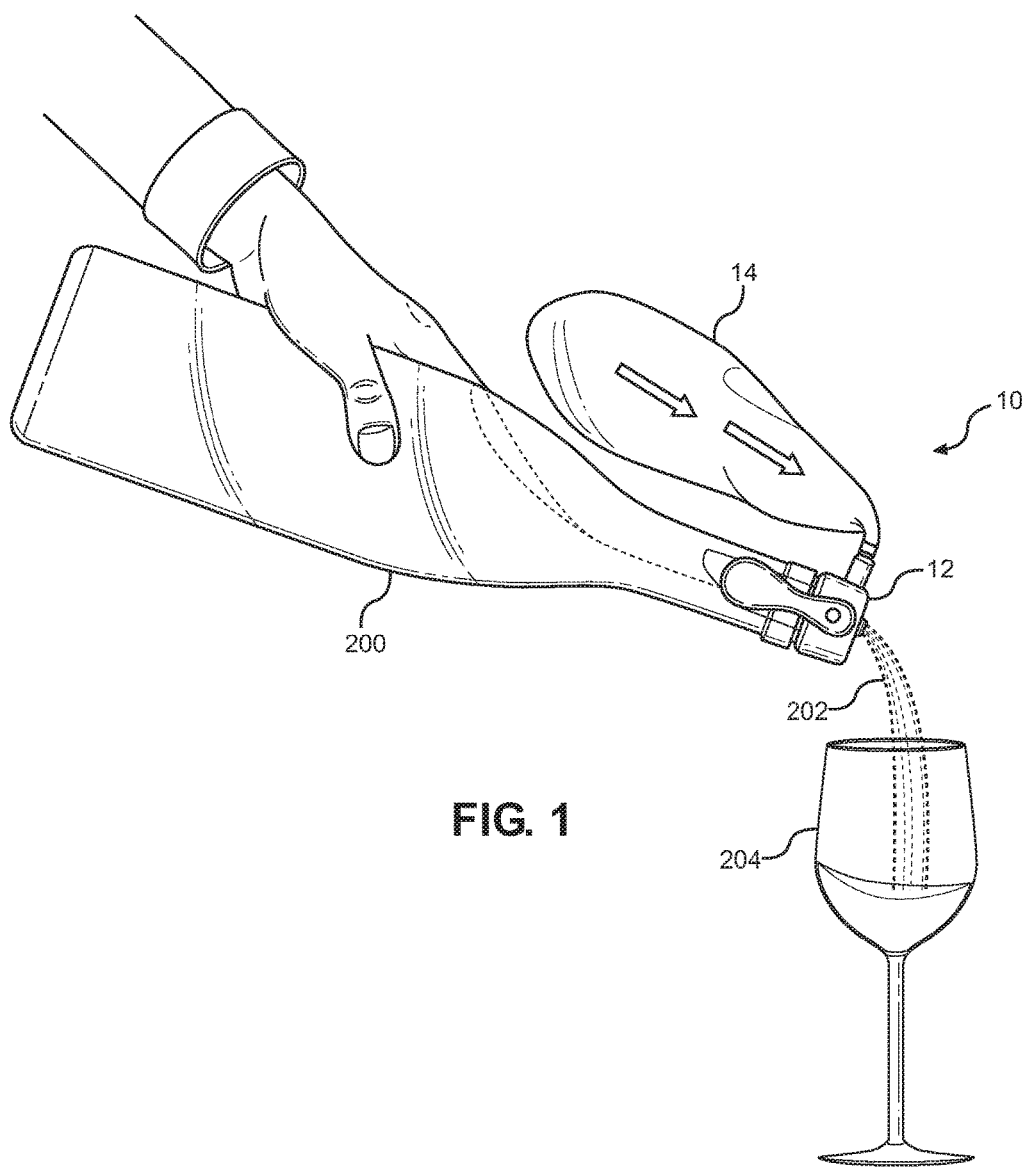
FIG. 1 is a view in front elevation of an embodiment of the volumetric displacement preservation system in use dispensing a volume of liquid from a vessel.

Looking more particularly to the drawings, a volumetric displacement preservation system according to the invention is indicated generally at 10 in FIG. 1 where the volumetric displacement preservation system 10 is depicted in use dispensing a volume of liquid 202 from a storage vessel 200 with an open inner volume containing the liquid 202 into a recipient vessel 204 for consumption or use. In the present example, the storage vessel 200 is a wine bottle 200, the retained liquid 202 is wine 202, and the recipient vessel 204 is a wine glass 204. However, it will be understood that the invention is not so limited. While wine and similar comestible liquids may be well served by use of the disclosed preservation system 10, numerous other applications will be obvious in view of the present disclosure, each being within the scope of the invention except as it might expressly be limited by the claims.

The storage vessel 200 has an open inner volume that is initially sealed, in the instance of a wine bottle 200 by a cork, to protect against spoilage. Once the storage vessel 200 is opened to cause exposure to oxygen-rich air, spoilage begins. As more of the liquid 202 is poured from the vessel 200, more air enters the inner volume of the vessel 200, and spoilage is accelerated. The preservation system 10 operates to minimize or, ideally, to eliminate that spoilage by preventing the entry of air into the inner volume as the liquid 202 is exhausted and instead insulating the liquid 202 against degradation by the replacement of the exhausted liquid 202 with a preservative gas, such as an inert gas, by volumetric displacement. Any type of preservative gas could be used within the scope of the invention except as it might be limited by the claims. For instance, the preservative gas could be nitrogen, argon, another preservative gas, or some combination thereof, subject perhaps to potential impurities. A volume of preservative gas is retained external to the vessel 200, potentially at approximately atmospheric pressure. For instance, the preservative gas can be retained in a collapsible or compressible vessel or a vessel otherwise reducible in open inner volume.

During dispensing of the liquid 202, an open fluidic inlet pathway is selectively provided between the volume of preservative gas external to the vessel 200 and the inner volume of the vessel 200 while a separate open fluidic exhaust pathway is provided for dispensing the liquid 202. With the fluidic pathways open, liquid 202 exhausted through the exhaust pathway will naturally draw in and be replaced by preservative gas passed through the inlet pathway. The inner volume of the vessel 200 will thus be occupied by the remainder of the volume of liquid 202 in the vessel 200 and the preservative gas received in exchange for the dispensed liquid 202. When a given volume of liquid 202 has been dispensed, the inlet and exhaust pathways can be closed to exclude the introduction of environmental air and to maintain the gaseous content of the inner volume of the vessel 200 ideally substantially or entirely consisting of the preservative gas, subject potentially to the volume of air, if any, present in the inner volume on initial installation of the volumetric displacement preservation system 10. The foregoing could be carried forth under a plurality of constructions within the scope of the invention.

In the embodiment first illustrated in FIG. 1 and then in greater detail in FIGS. 2A through 3B, the volumetric displacement preservation system 10 has a fluid exchange structure 12 that selectively and, potentially in a substantially simultaneous event, establishes and closes the above-described inlet and exhaust pathways. The fluid exchange structure 12 has a stopper 16 with a plurality of annular sealing ridges 22 therealong that cooperate to create a sealing engagement with the vessel 200, in this case with the neck 206 of the wine bottle 200, and a head portion 18 accessible from external to the vessel 200. While separate valves could be provided within the scope of the invention for opening and closing the inlet and exhaust pathways, the depicted preservation system 10 provides a fluid exchange valve 32 that has a first condition, depicted in FIGS. 2A and 2B, wherein the inlet and exhaust pathways are substantially sealed and a second condition, depicted in FIGS. 3A and 3B, wherein the inlet and exhaust pathways are opened.

The stopper 16 and the head portion 18 are shown as a unitary member, but it is possible for them to be separately formed. The stopper 16, the head portion 18, and the fluid exchange valve 32 could be formed from any suitable material or materials. In one contemplated embodiment, the fluid exchange valve 32 could be made from a rigid material, such as a metal. The stopper 16 and the head portion 18 could be formed from a more flexible and resilient material, such as a polymer. By way of example and not limitation, the fluid exchange valve 32 could be crafted from stainless steel while the stopper 16 and the head 18 could be formed from silicone.

Figure 15:
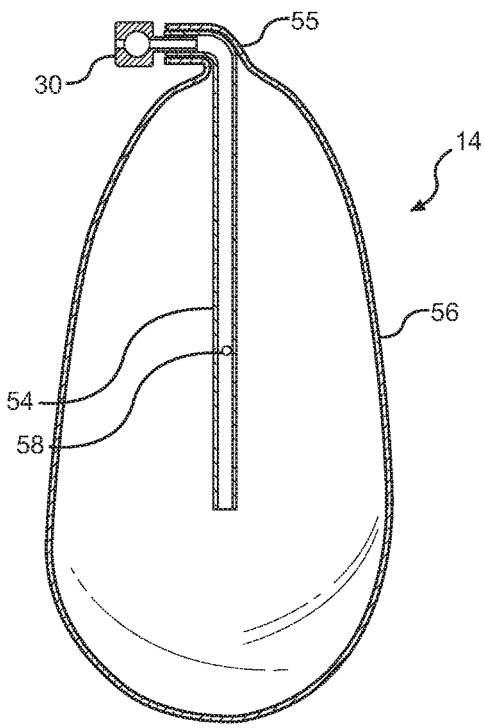
FIG. 15 is a cross-sectional view of an external preservative supply bladder according to the invention.
Figure 16:
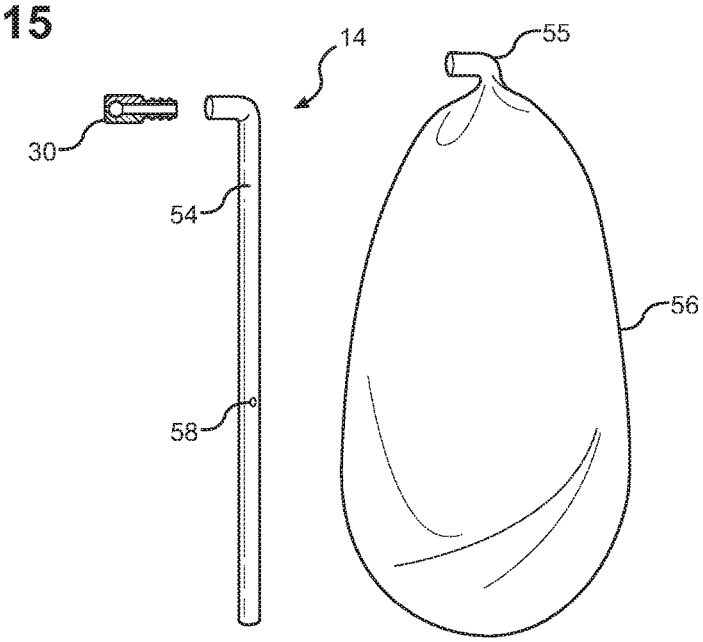
FIG. 16 is an exploded view in front elevation of the external preservative supply bladder according to the invention.

Preservative gas is supplied to the inner volume of the vessel 200 through the inlet pathway during a dispensing of liquid 202 from an expandable and compressible bladder 14, which is shown in cross-sectional and exploded views in FIGS. 15 and 16. There, the bladder 14 can be seen to have a shell 56, which can be of a flexible and substantially gas impermeable material. Numerous such materials are possible, each within the scope of the invention. In one embodiment, for example, the shell 56 of the bladder 14 can be a polymeric material with or without a lining layer. The material defining the shell 56 could, for example, comprise a foil formed by one or more layers of polymeric material with an aluminum lining. The shell 56 can be sealed but for an orifice 55. A tube structure 54 with an elongate portion within the shell 56 and a lateral portion that is received by the orifice 55 is sealingly engaged with the valve coupling 30. One or more apertures 58 can be disposed along the tube structure 54 to facilitate gas flow. The valve coupling 30 can have an automatically sealed condition when not engaged with the valve coupling 28 of the fluid exchange structure 12 and an automatically bidirectionally open condition when engaged with the valve coupling 28. The inner volume of the bladder 14 can vary depending on, among other things, the intended application. In certain practices of the invention, the bladder 14 can have an inner volume corresponding to the inner volume of the vessel 200 or the volume of the liquid 202 retained therein.

As shown, for instance, in FIGS. 7 through 10, the fluid exchange valve 32 has a base portion 34 and a dispensing nozzle 36 that projects from the base portion 34. In this embodiment, the base portion 34 is barrel, round, or rod shaped, and the dispensing nozzle 36 projects orthogonally from a central portion of the barrel-shaped base portion 34. The base portion 34 has first and second conduit joining passageways 48A and 48B, each with an opening to the dispensing nozzle 36 and an opening along the outer surface of the base portion 34 opposite to the nozzle 36. As shown most clearly in FIGS. 7 through 10, the openings of the conduit joining passageways 48A and 48B along the outer surface of the base portion 34 are disposed in opposed outboard positions from a centerline established by the nozzle 36.

A conduit joining channel 46 is disposed in the outer surface of the base portion 34 of the fluid exchange valve 32. In this embodiment, the conduit joining channel 46 is disposed along a tangent to a mid-portion of the base portion 34 in substantial alignment with the nozzle 36 and along a path generally parallel to the paths of the conduit joining passageways 48A and 48B. The conduit joining passageways 48A and 48B thus have portions thereof disposed outboard of the conduit joining channel 46. The conduit joining channel 46 thus represents a central groove across and tangent to the barrel-shaped base portion 34 while the first and second conduit joining passageways 48A and 48B join together to meet and establish a fluidic pathway with the dispensing nozzle 36, including within the inner volume of the base portion 34 underlying the wall portion in which the conduit joining channel 46 is formed.

The fluid exchange valve 32 is pivotably retained by the head portion 18 of the fluid exchange structure 12 with the barrel-shaped base portion 34 received in a correspondingly shaped and sized valve barrel pathway 52 that communicates laterally within the head portion 18 and with the nozzle 36 pivotable within an elbow-shaped valve positioning pathway 50. With the base portion 34 rotatable within the valve barrel pathway 52, the fluid exchange valve 32 can be pivoted from a first, closed position with the dispensing nozzle 36 orthogonal to a longitudinal axis of the stopper 16 and a second, open position with the dispensing nozzle 36 in line with the longitudinal axis of the stopper 16.

Figure 14:
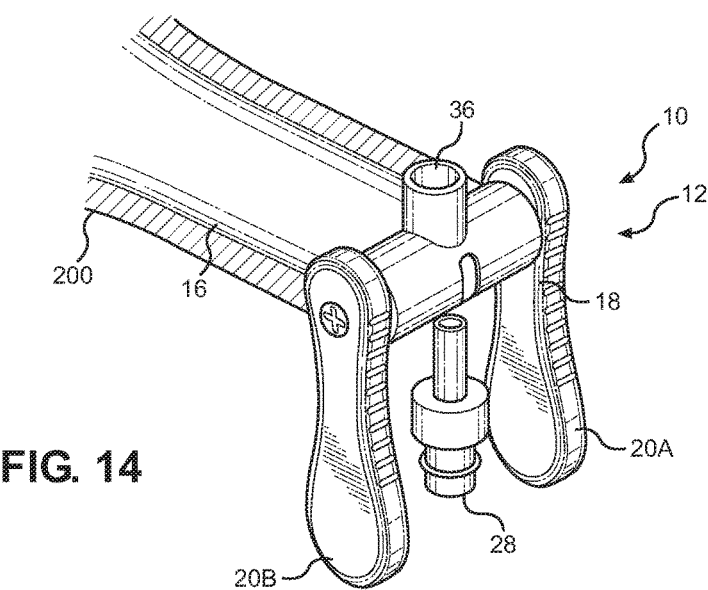
FIG. 14 is a perspective view of the fluid exchange structure applied to a vessel with the unified fluid exchange valve in a closed position.

The fluid exchange valve 32 could be manipulated between the first and second positions in any effective manner, including by a handle, directed manual engagement with the valve 32, by some automated or remote mechanism, or by any effective mechanism. In the depicted embodiment, as can be appreciated best with additional reference to FIG. 14, the valve 32 is pivotable by operation of either or both of first and second lever arms 20A and 20B that are secured to and fixed to pivot with opposed ends of the base portion 34. In one practice of the invention, the first and second lever arms 20A and 20B can be disposed to align longitudinally with the stopper 16 and the bottle 200 in general when the fluid exchange valve 32 is in the open position as, for instance, in FIGS. 1, 3A, and 3B, and the first and second lever arms 20A and 20B can be disposed to be generally perpendicular to a longitudinal of the stopper 16 and the bottle 200 in general when the fluid exchange valve 32 is in the closed position as, for instance, in FIGS. 2A, 2B, and 14. The lever arms 20A and 20B in this embodiment are substantially equal in size and shape. With this, the arms 20A and 20B are operative as stabilizing legs when in the first, closed position as in FIG. 14. With that, a bottle 200 or other vessel can be stably rested on a support surface with the arms 20A and 20B cooperating to support the upper end of the bottle 200. Each arm 20A and 20B can have a length from its pivot axis to its distal end greater than the dispensing valve 28 where the arms 20A and 20B and the dispensing valve project co-directionally, and that length could, for instance, be calibrated to correspond to the radius of the base of a typical wine bottle 200 such that the bottle 200 could be retained horizontally or at some desired angle of incline or decline.

With combined reference to FIGS. 2B, 3B, 4, and 5, the stopper 16 can be perceived to have a liquid exhaust conduit 24 and a gas inlet conduit 26. The liquid exhaust conduit 24 is larger in cross-sectional area than the gas inlet conduit 26. Each conduit communicates longitudinally along the stopper with a first end that is open to the inner volume of the vessel 200 when the stopper 16 is applied thereto, and each conduit 24 and 26 has a second end that is open to the valve positioning pathway 50 and is thus open to the fluid exchange valve 32. At their second ends, the conduits 24 and 26 terminate in relatively narrowed conduit portions 45 and 38 respectively. The conduit portion 38 approximates the shape and cross-sectional area of the conduit joining channel 46, and the conduit portion 45 has a cross-sectional area spanning to overlap the conduit joining passageways 48A and 48B when they are aligned with the conduit 45. A distal conduit portion 40 is disposed in the head portion with a first end open to the valve positioning pathway and the fluid exchange valve 32 and a second end open to the valve coupling 28. As best seen, for instance, in FIG. 4, the barrel-shaped base portion 34 of the fluid exchange valve 32 has a first solid wall portion 42 that operates to overlie and seal the conduit portion 45 of the liquid exhaust conduit 24 and a solid wall portion 44 that operates to overlie and seal the conduit portion 38 of the gas inlet conduit 26 when the fluid exchange valve 32 is in the closed position.

Figure 2A:
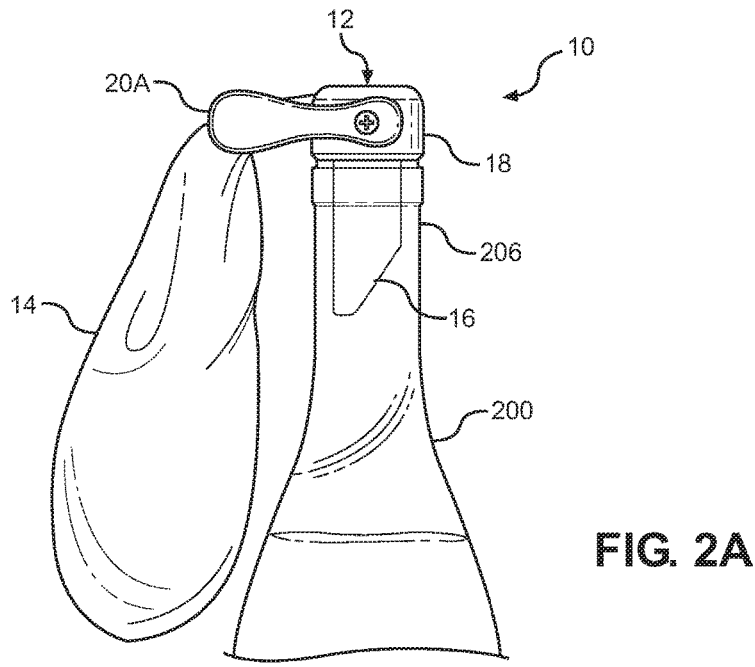
FIG. 2A is a view in front elevation of the preservation system of FIG. 1, again applied to a vessel, with the unified fluid exchange valve in a closed position.
Figure 2B:
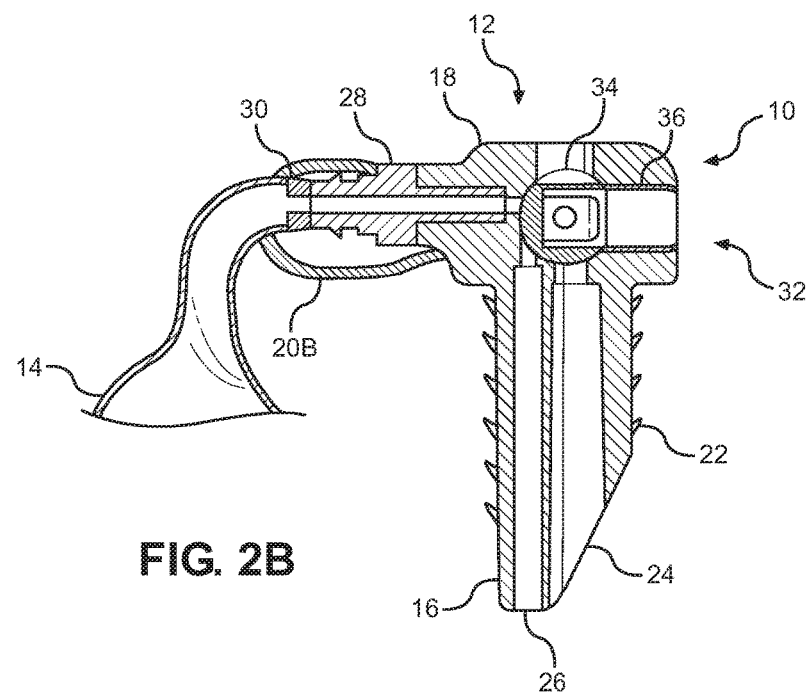
FIG. 2B is a cross-sectional view of the preservation system of FIG. 2A with the unified fluid exchange valve in a closed position.
Figure 3A:
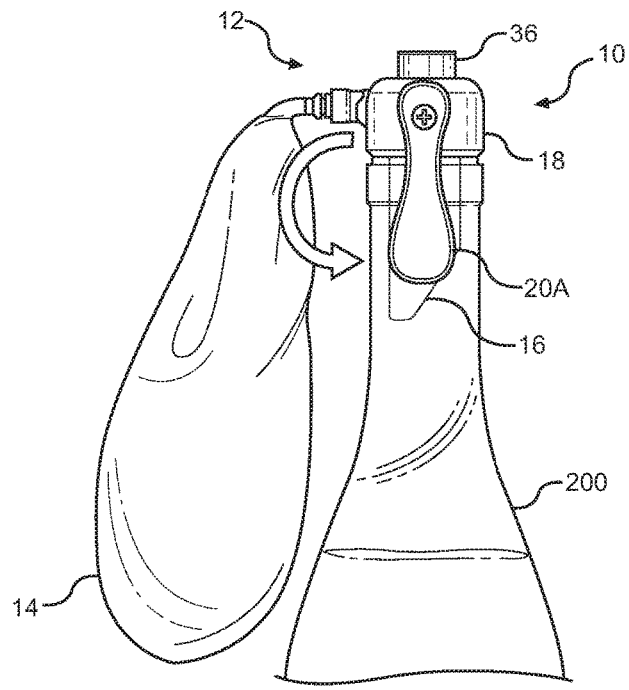
FIG. 3A is a view in front elevation of the preservation system of FIG. 1 applied to a vessel, with the unified fluid exchange valve in an open position.
Figure 3B:
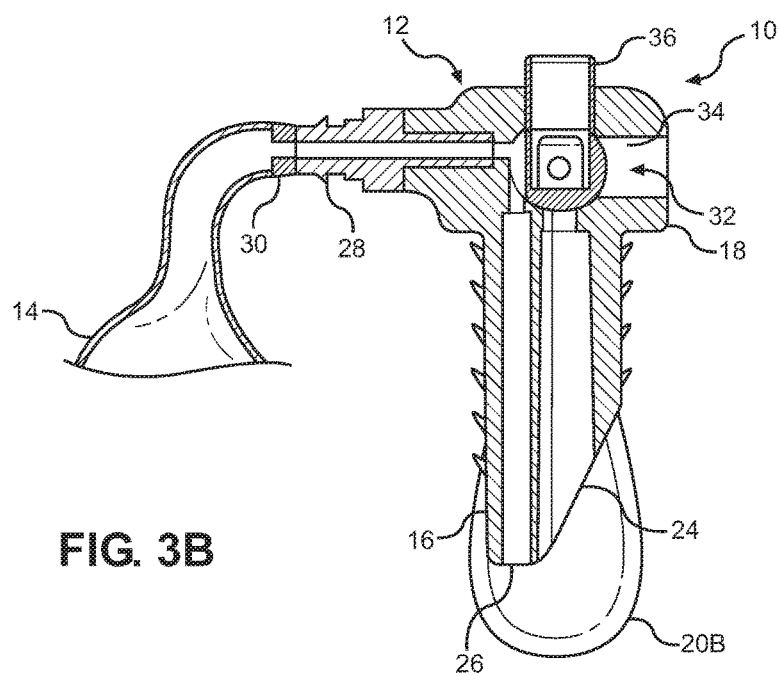
FIG. 3B is a cross-sectional view of the preservation system of FIG. 2A with the unified fluid exchange valve in an open position.
Figure 4:
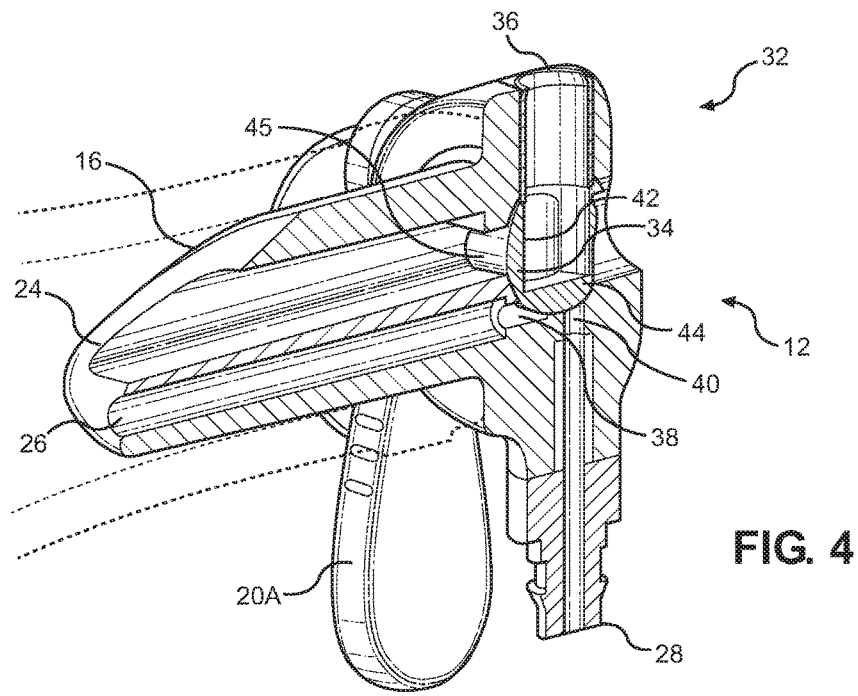
FIG. 4 is a sectioned perspective view of the preservation system of FIG. 1 applied to a vessel with the unified fluid exchange valve in a closed position.
Figure 5:
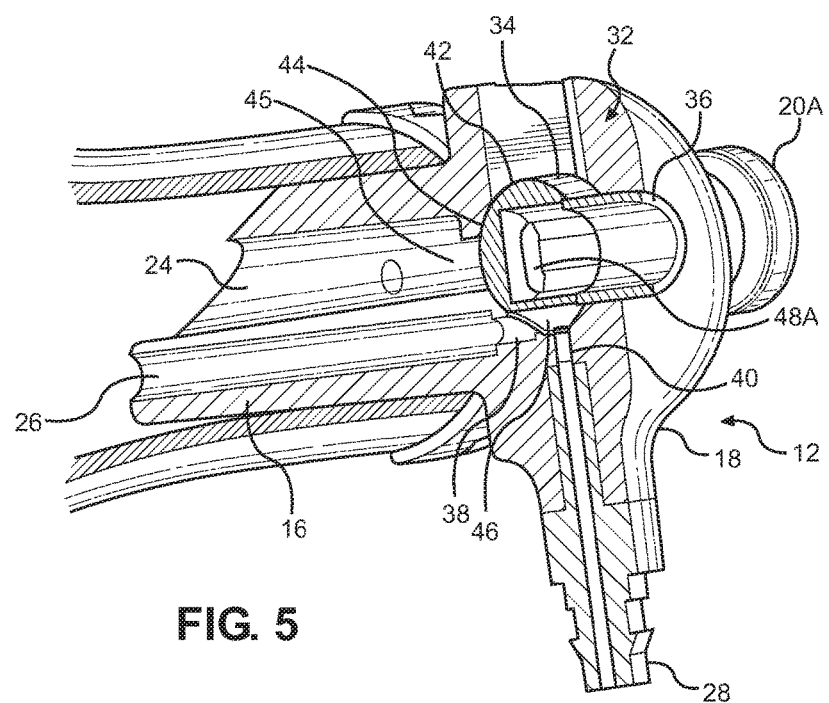
FIG. 5 is a sectioned perspective view of the preservation system of FIG. 1 applied to a vessel with the unified fluid exchange valve in an open position.
Figure 6:
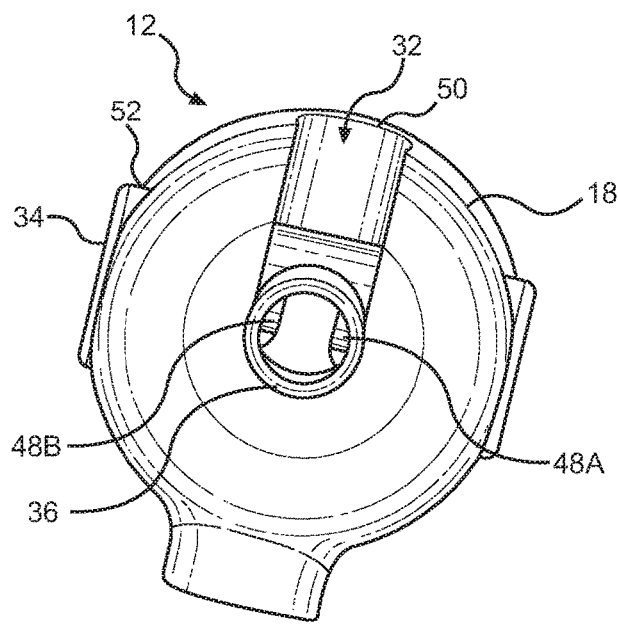
FIG. 6 is a top plan view of the fluid exchange structure formed by the unified fluid exchange valve and the fluid exchange stopper with the fluid exchange stopper in an open position.
Figure 7:
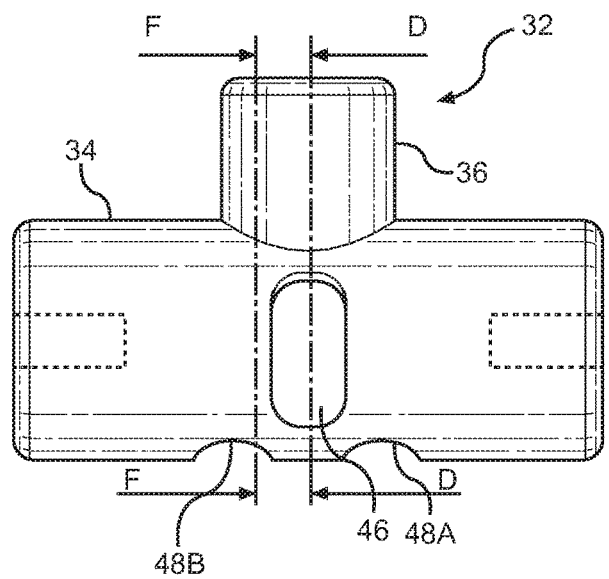
FIG. 7 is a top plan view of the unified fluid exchange valve.
Figure 8:
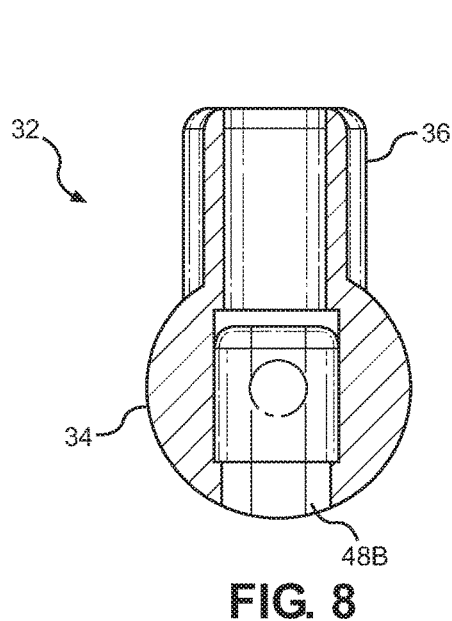
FIG. 8 is a cross-sectional view of the unified fluid exchange valve taken along the line F-F in FIG. 7.
Figure 9:
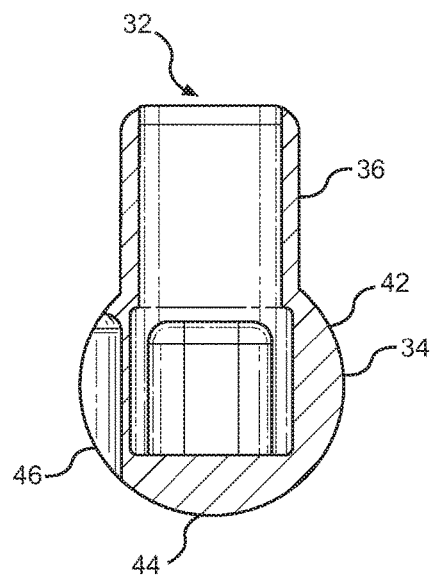
FIG. 9 is a cross-sectional view of the unified fluid exchange valve taken along the line D-D in FIG. 7.
Figure 10:
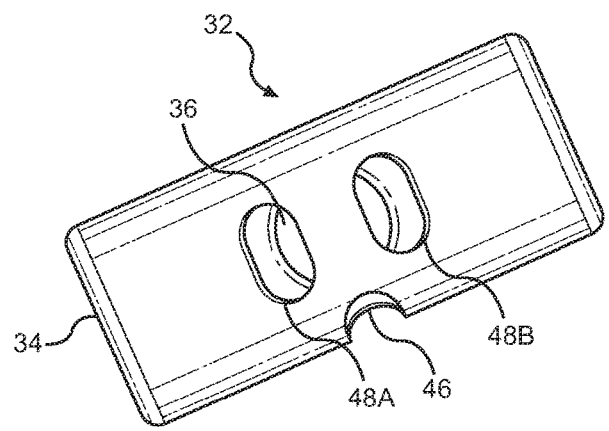
FIG. 10 is a view in rear elevation of the unified fluid exchange valve.
Figure 11:
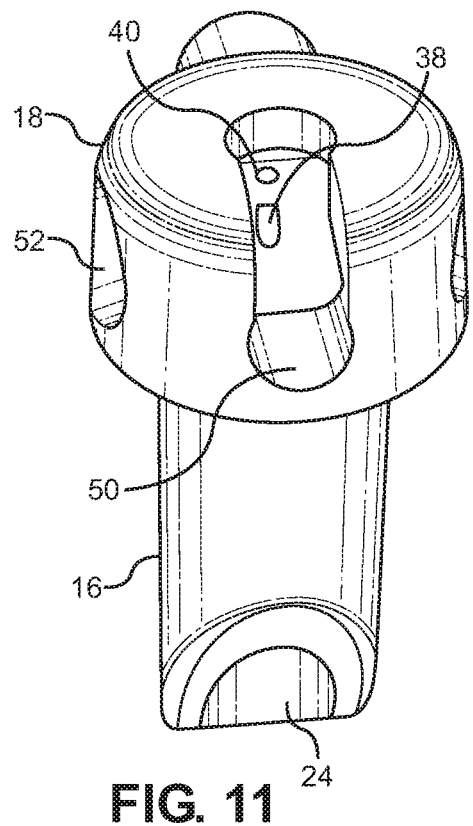
FIG. 11 is a perspective view of the fluid exchange stopper.
Figure 12:
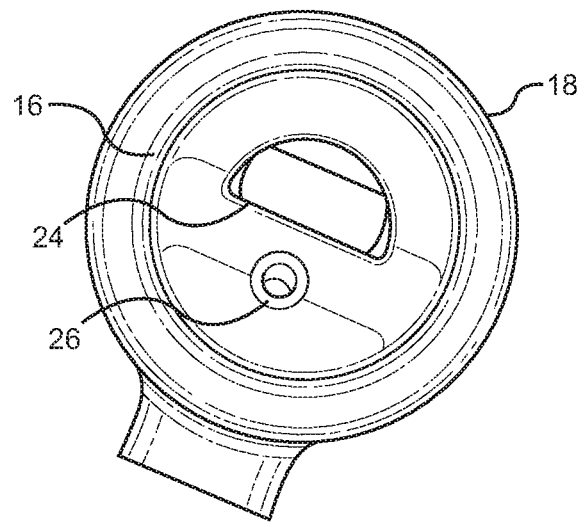
FIG. 12 is a bottom plan view of the fluid exchange stopper.
Figure 13:
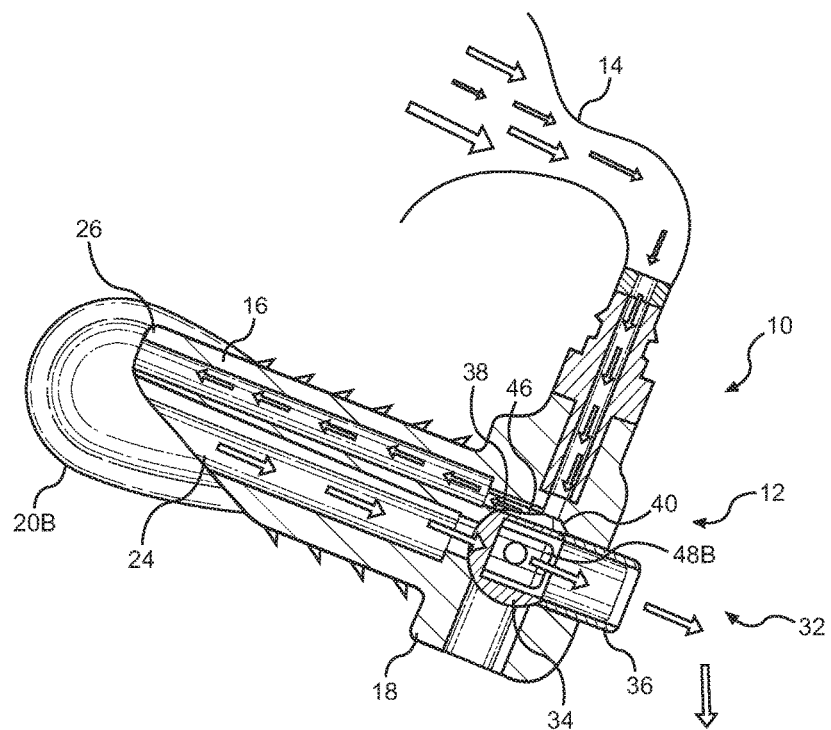
FIG. 13 is a cross-sectional view of the preservation system of FIG. 1 with the unified fluid exchange valve in an open position schematically depicting a fluid exchange process.

Under this construction, orientation of the fluid exchange valve 32 in the closed position, as is illustrated, for instance, in FIGS. 2A, 2B, and 4 will cause the solid wall portions 42 and 44 of the fluid exchange valve 32 to seal the ends of the liquid exhaust conduit 24 and the gas inlet conduit 26 of the stopper 16, and the dispensing nozzle 36 will be disposed in a storage position against the radially communicating lower surface of the valve positioning pathway 50. With that, the inner volume of the vessel 200 is sealed; liquid cannot be exhausted, and gas cannot enter. Adjustment of the fluid exchange valve 32 to the open position illustrated, for example, in FIGS. 3A, 3B, and 5, will rotate the solid wall portions 42 and 44 out of alignment with the conduits 24 and 26. The conduit joining channel 46 and the conduit joining passageways 48A and 48B are rotated into the positions illustrated. An open fluidic inlet pathway is provided from the inner volume of the vessel 200, through the conduit 26, the conduit joining channel 46, the distal conduit portion 40, and the valve coupling 28. Simultaneously, an open fluidic exhaust pathway is created from the inner volume of the vessel 200, through the conduit 24, the conduit joining passageways 48A and 48B, and the dispensing nozzle 36. With the fluidic pathways open, liquid exhausted through the open exhaust pathway will naturally draw in and be replaced by preservative gas drawn into the inner volume of the vessel through the open inlet pathway from the compressible bladder 14 as shown schematically, for example, in FIG. 13.

Figure 17A:
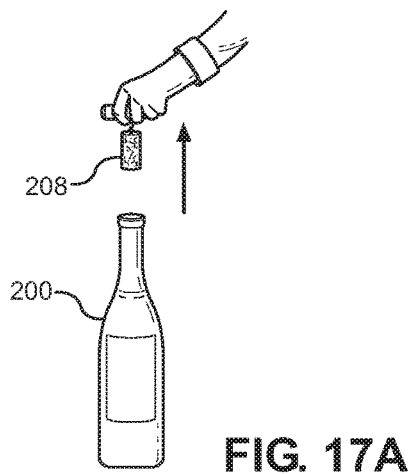
FIGS. 17A through 17E depict a series of steps in a process of dispensing and preserving a volume of liquid in relation to an inner volume of a vessel as taught herein.
Figure 17B:
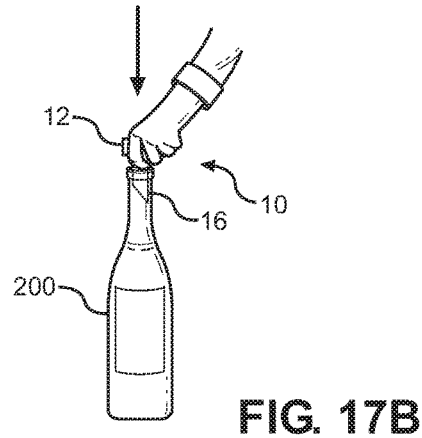
Figure 17C:
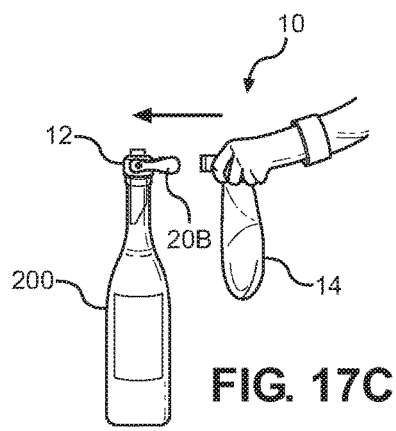
Figure 17D:
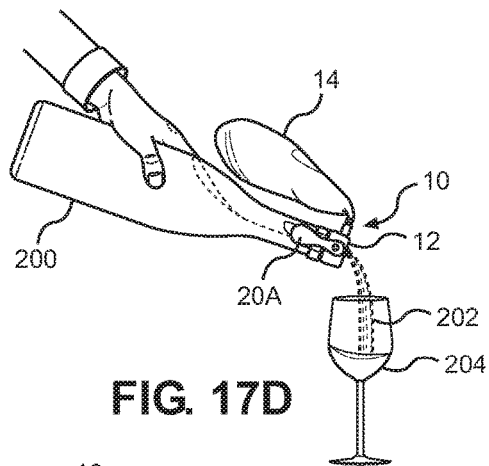
Figure 17E:
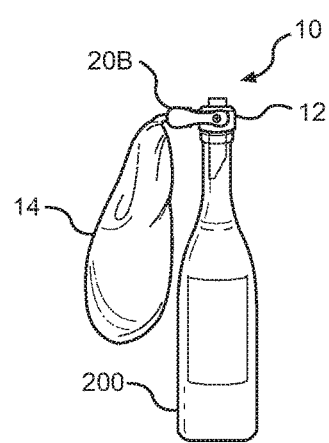
Figure 18:
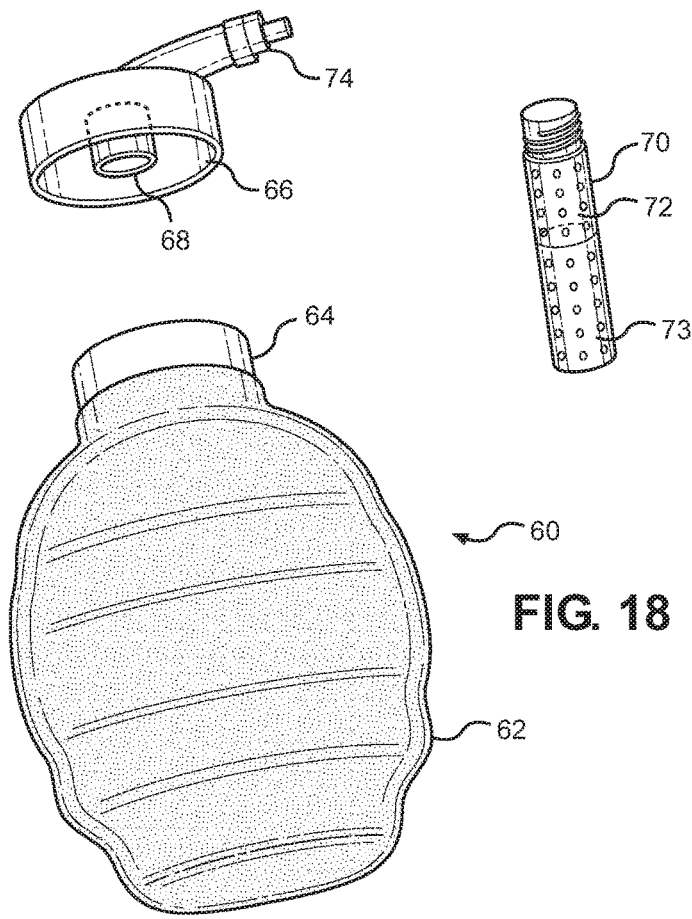
FIG. 18 is an exploded perspective view of an inert gas production canister as taught herein.
Figure 19:
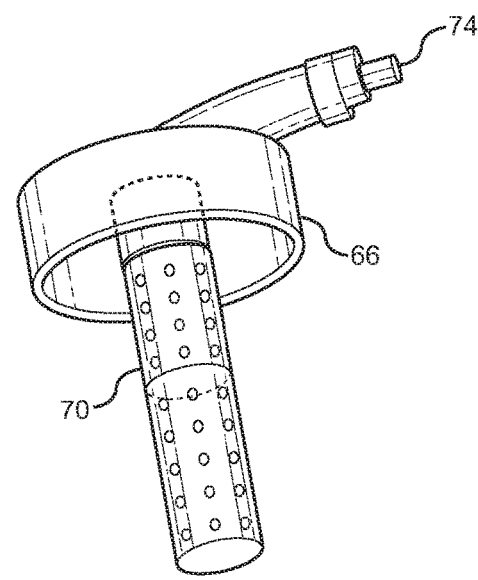
FIG. 19 is a perspective view of a lid portion of the inert gas production canister.

Under this construction, a process for preserving the contents of a vessel 200 can be practiced as suggested by combined reference to FIGS. 17A through 17E where the volumetric displacement preservation system 10 is again employed in the preservation of wine 202 in a wine bottle 200. In this example, the original cork 208 can be first removed from the wine bottle 200 as in FIG. 17A, and the stopper 16 of the volumetric displacement preservation system 10 can be inserted in its stead, potentially with the fluidic exchange valve 32 in a closed condition whereby the inner volume of the bottle 200 will be sealed to the outside atmosphere. The bladder 14 can then be engaged with the fluid exchange structure 12 as shown in FIG. 17C. Then, in any order, the vessel 200 can be disposed in a dispensing condition, such as by being tilted over a receiving vessel 204, and the fluidic exchange valve 32 can be adjusted to an open condition, such as by operation of one or both of the lever arms 20A or 20B. With that, the fluidic inlet and exhaust pathways will be opened. The liquid 202 can then be exhausted, such as by the force of gravity, as shown in FIG. 17D. However, it will be appreciated that the application of a compressive pressure on the bladder 14 could additionally or alternatively be used to force preservative gas into the open inner volume of the vessel 200. In any event, as liquid 202 is passed from the inner volume of the vessel 200 through the fluidic exhaust pathway, preservative gas will pass into the inner volume of the vessel 200 from the bladder 14 in volumetric displacement. The bladder 14 will deflate corresponding to the volume of liquid 202 dispensed, and the inner volume of the vessel 200 will then retain the received volume of preservative gas in protection of the remaining contents of the vessel against degradation. The fluidic exchange valve 32 can be adjusted to the closed position illustrated in FIG. 17E, potentially during the dispensing of liquid 202 from the vessel 200 to prevent the introduction of ambient air into the inner volume of the vessel 200.

Figure 22A:
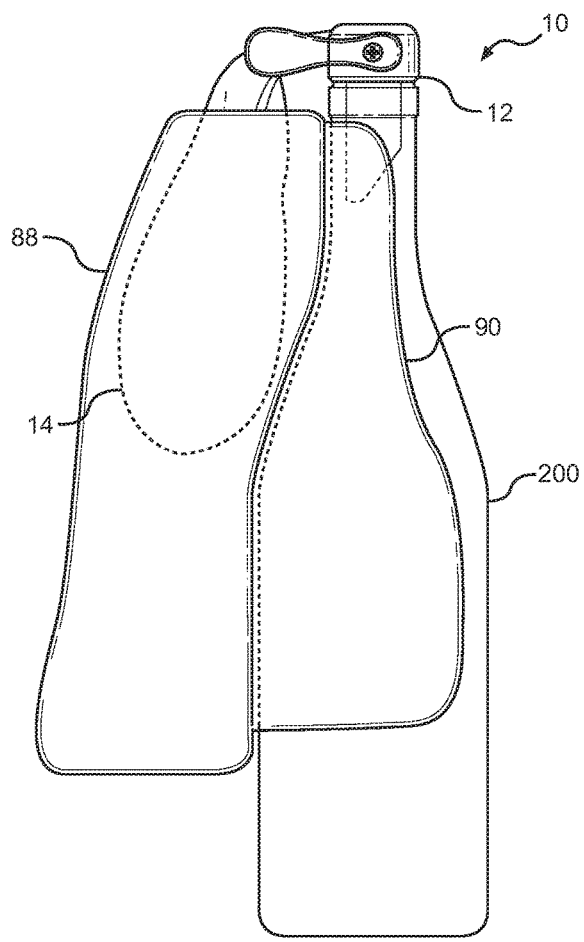
FIG. 22A is a view in side elevation of an embodiment of the preservation system with a shell applied to a vessel.
Figure 22B:
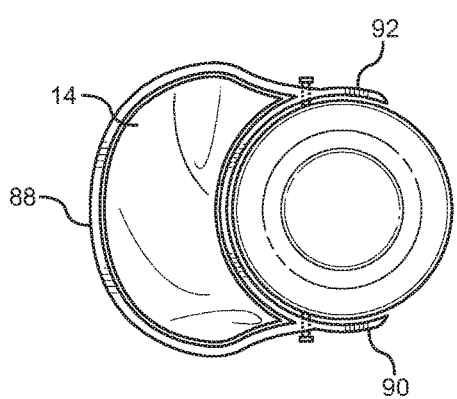
FIG. 22B is a bottom plan view of the preservation system with a shell applied to a vessel of FIG. 22A.

As illustrated, for example, in FIG. 1, the bladder 14 and the remainder of the volumetric displacement preservation system 10 could be used in an unprotected fashion. It is contemplated, however, that the bladder 14 could be partially, substantially, or entirely enveloped in a protective shell 88, which can be substantially rigid, as seen in FIGS. 22A and 22B. There, the protective shell 88 is contoured, including with an inner wall that can correspond to the contour of the vessel 200. The protective shell 88 can be retained in place relative to the volumetric displacement preservation system 10 in any effective manner. In this example, first and second arcuate wings 90 and 92, which can be fixed or resilient, are fixed to the protective shell 88 to receive and engage the vessel 200. For instance, a wine bottle 200 could be slid longitudinally into engagement with the protective shell 88 and the wings 90 and 92, or the wings 90 and 92 could be outwardly biased and the wine bottle 200 inserted therebetween. In any case, where the bladder 14 is disposed in a protective shell 88, inadvertent compression, displacement, or damage to the bladder 14 can be prevented.

Figure 23:
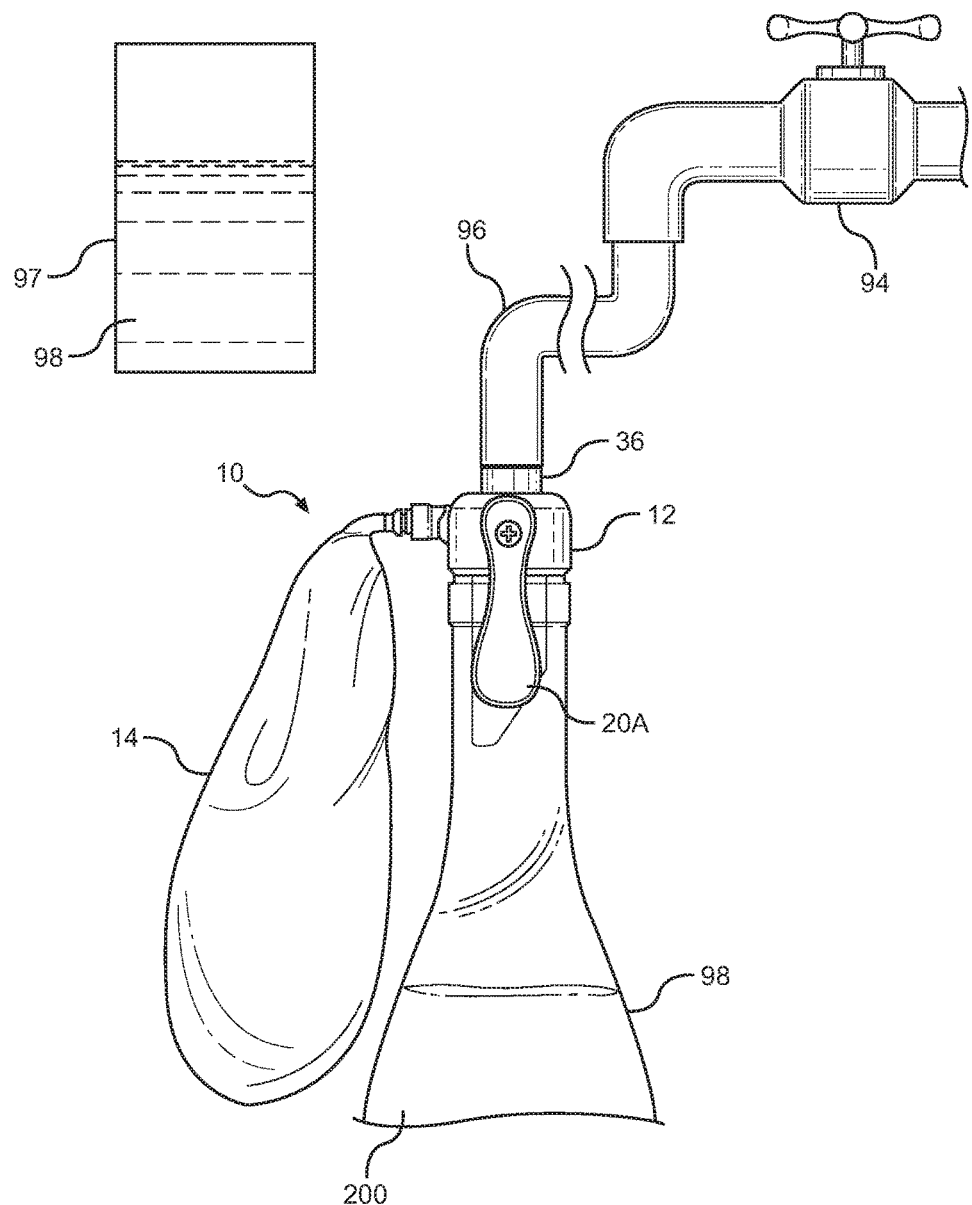
FIG. 23 is a perspective view of an embodiment of the preservation system during a process of gas retrieval by volumetric displacement.
Figure 24A:
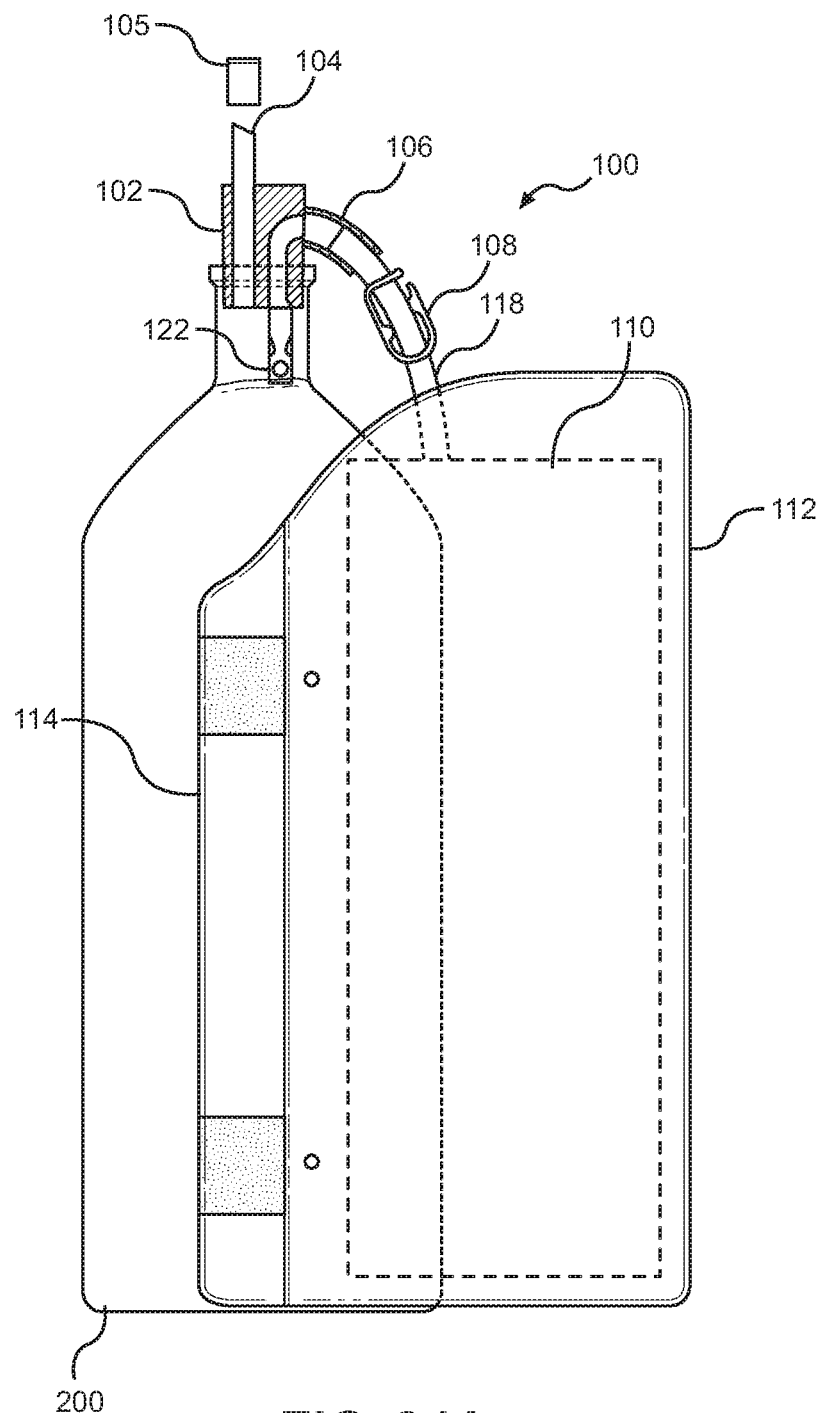
FIG. 24A is a view in side elevation of an alternative embodiment of the preservation system with a shell applied to a vessel.
Figure 24B:
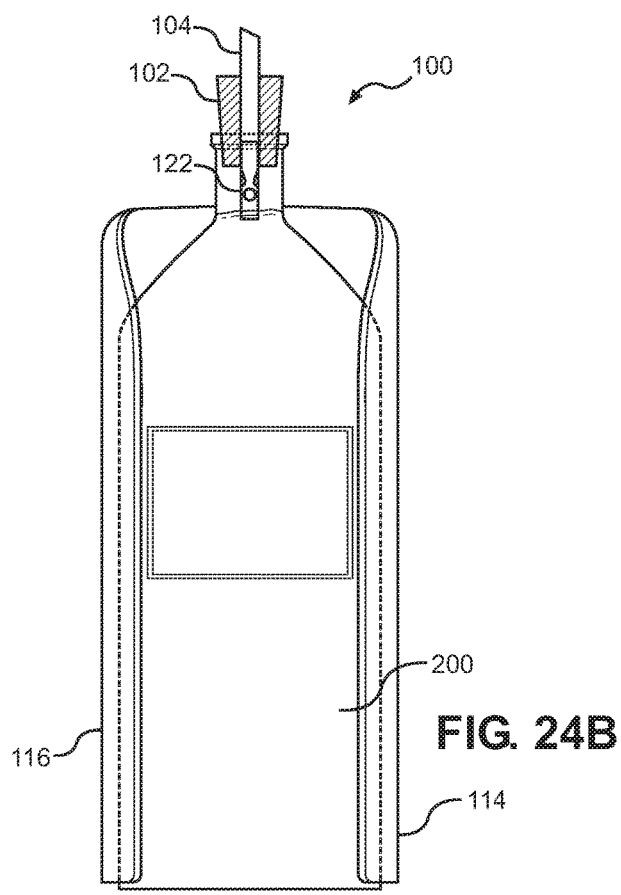
FIG. 24B is a view in front elevation of an alternative embodiment of the preservation system with a shell applied to a vessel of FIG. 24A.
Figure 24C:
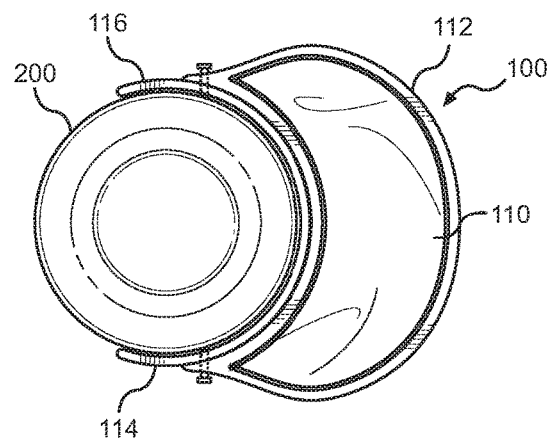
FIG. 24C is a bottom plan view of the preservation system with a shell applied to a vessel of FIG. 24A.
Figure 25A:
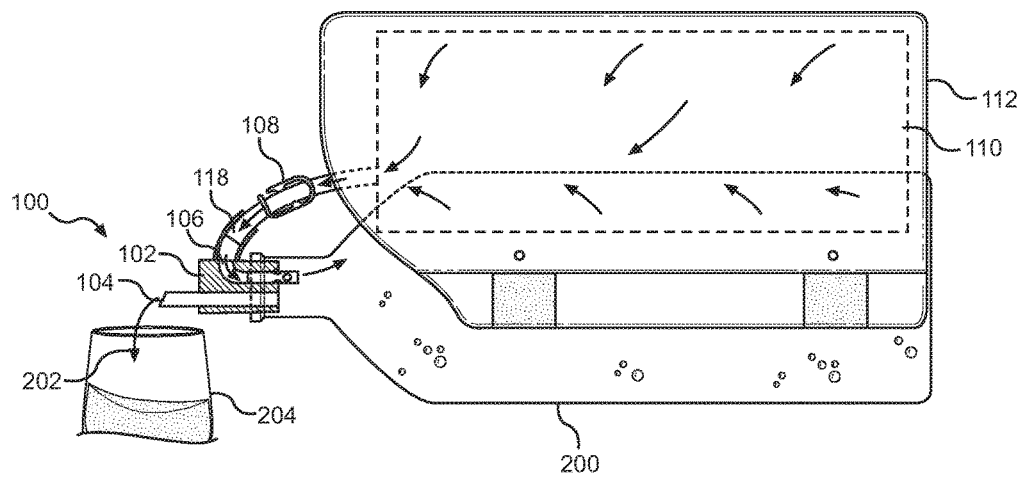
FIGS. 25A through 25C depict a series of steps in a process of dispensing and preserving a volume of liquid in relation to an inner volume of a vessel as taught herein.
Figure 25B:
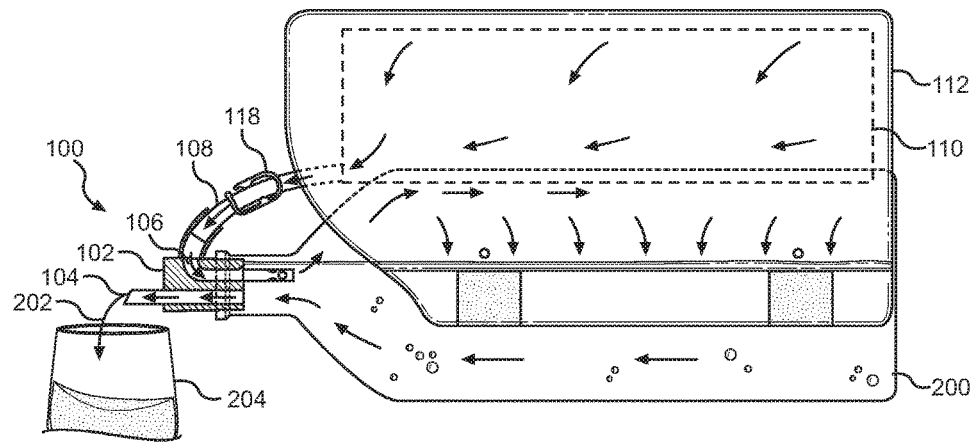
Figure 25C:
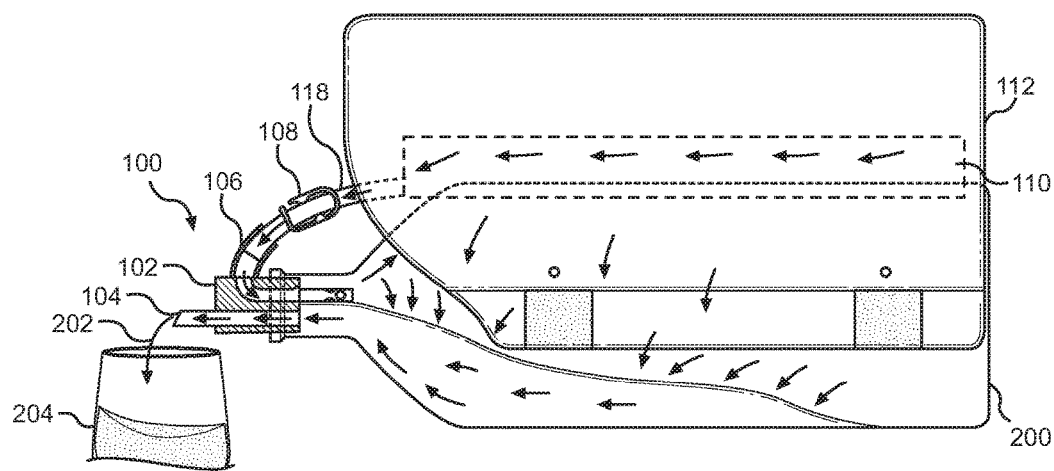

At some point, the usable volume of preservative gas in the bladder 14 will be exhausted, and the bladder 14 must be replenished or replaced. One advantageous method for replenishing the preservative gas in the bladder 14 can be understood with further reference to FIG. 23. There, a reverse volumetric displacement process is shown for harvesting preservative gas from the inner volume of a vessel 200 whose liquid contents have been dispensed and volumetrically replaced by preservative gas. The dispensing nozzle 36 is connected to a source of displacement liquid, such as water or any other liquid, by a conduit 96. The displacement liquid could even in theory be the same type of liquid that was dispensed. While any source of displacement liquid could be employed, one illustrated source is a faucet 94 and another illustrated source is a displacement vessel 97 holding a volume of displacement liquid 98. The displacement vessel 97 could, for example, hold a volume of liquid 98 at least equal to the volume of preservative gas to be harvested from the inner volume of the vessel 200.

In any event, with the source of displacement liquid fluidically connected to the exhaust nozzle 36 by the conduit 96 and the fluidic exchange valve 32 adjusted to an open condition, displacement liquid 98 can be caused to flow into the inner volume of the vessel 200 through the exhaust nozzle 36 and the fluidic exhaust pathway in communication therewith. The displacement liquid 98 could simply flow under the force of gravity, or it could be supplied under a given pressure. By volumetric displacement, the incoming displacement liquid 98 will force the preservative gas from within the inner volume of the vessel 200 back into the bladder 14. With that, the same preservative gas, or at least some portion thereof, can be reused.

While the displacement vessel 97 could comprise any type of vessel including a beaker, a glass, or any other vessel, it is possible that the displacement vessel 97 could match the vessel 200 in size and shape. Where the vessel 200 comprises a wine bottle 200, the displacement vessel 97 could even comprise another wine bottle, such as a used bottle filled with water or another displacement liquid 98, or even a new wine bottle filled with wine. To this extent, it is possible and within the scope of the invention for a single vessel 200, which might be shaped as a wine bottle or a vessel of another shape, and, additionally or alternatively, a single volume of preservative gas, to be used repeatedly or indefinitely. In such a practice, liquid 202 within the vessel 200 can be progressively exhausted and volumetrically replaced by preservative gas. Then, displacement liquid 98, such as wine from a new bottle acting as a displacement vessel 97, water, or some other liquid, can be passed into the inner volume of the vessel 200 to refill the vessel 200 with liquid 202 and the bladder 14 with preservative gas.

Figure 21A:
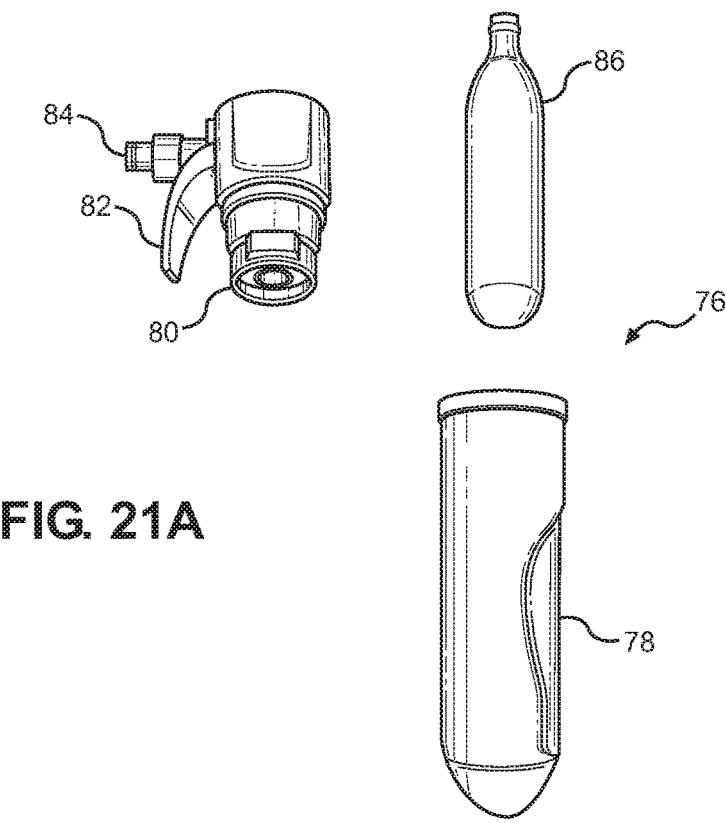
FIG. 21A is an exploded perspective view of a compressed inert gas supply system usable under the present invention.
Figure 21B:
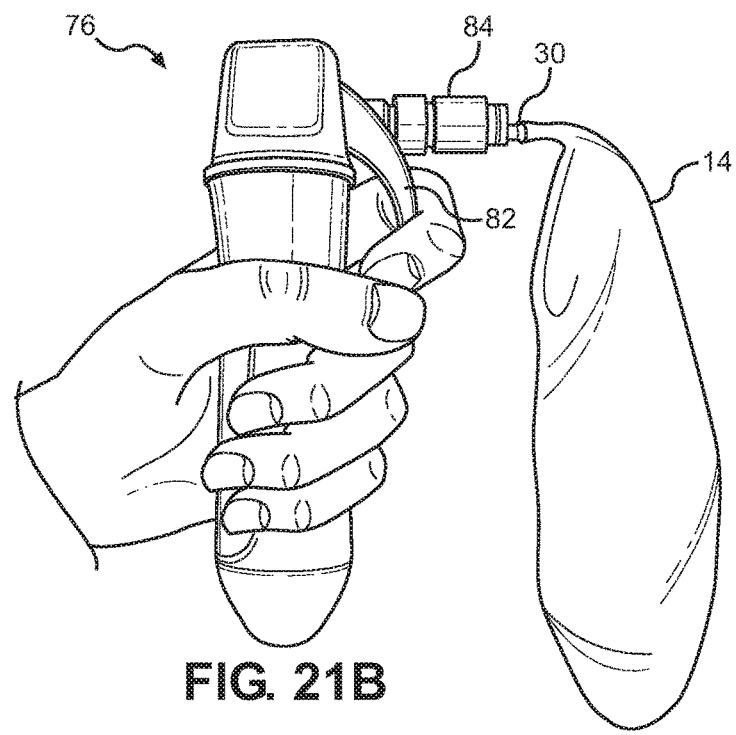
FIG. 21B is a perspective view of the compressed inert gas supply system during a replenishing of a preservative supply bladder.

Of course, the bladder 14 could be replenished by additional or alternative methods. For instance, as shown in FIGS. 21A and 21B, it would be possible to use a compressed gas supply 76 with a compressed gas cylinder 86 containing a volume of preservative gas. Any preservative gas could be used herein, including inert gases, such as but not limited to nitrogen or argon. The compressed gas cylinder 86 could, for example, be inserted into a cylindrical dispenser base 78 and then sealingly engaged with a dispenser head 80 that is operative by a trigger 82 to selectively dispense gas through a dispensing nozzle 84. With this, the valve connector 30 of the bladder 14 can be engaged with the dispensing nozzle 84, and the trigger 82 can be actuated to refill the bladder 14. As taught herein, the dispensing nozzle 84 can have a narrow dispensing aperture so that the compressed gas can be dispensed only at a low flow rate thereby to prevent inadvertent overfilling of the bladder 14.

Figure 29A:
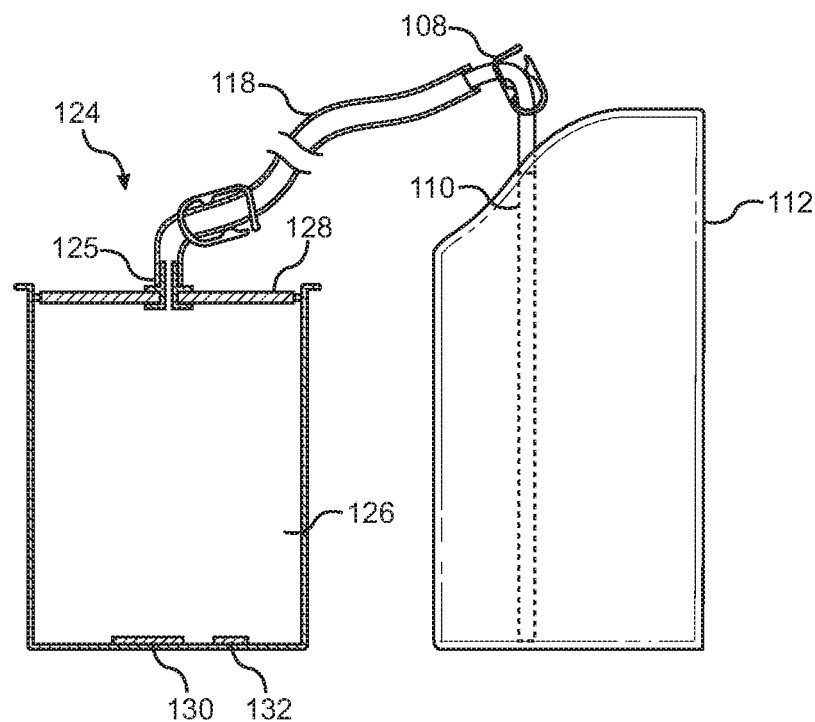
FIGS. 29A through 29C depict a series of steps in a process of producing and harvesting inert gas using an alternative inert gas production canister.
Figure 29B:
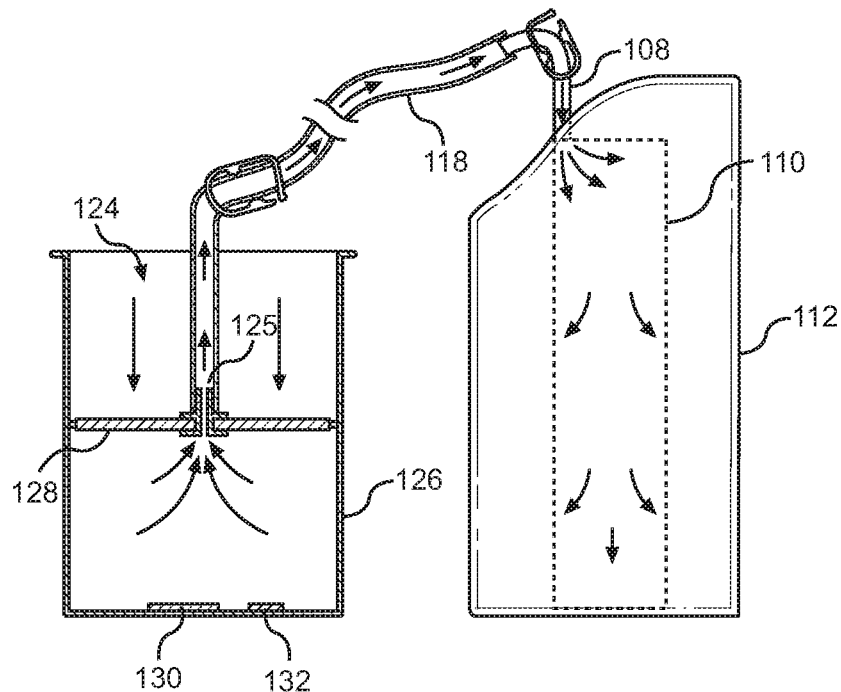
Figure 29C:
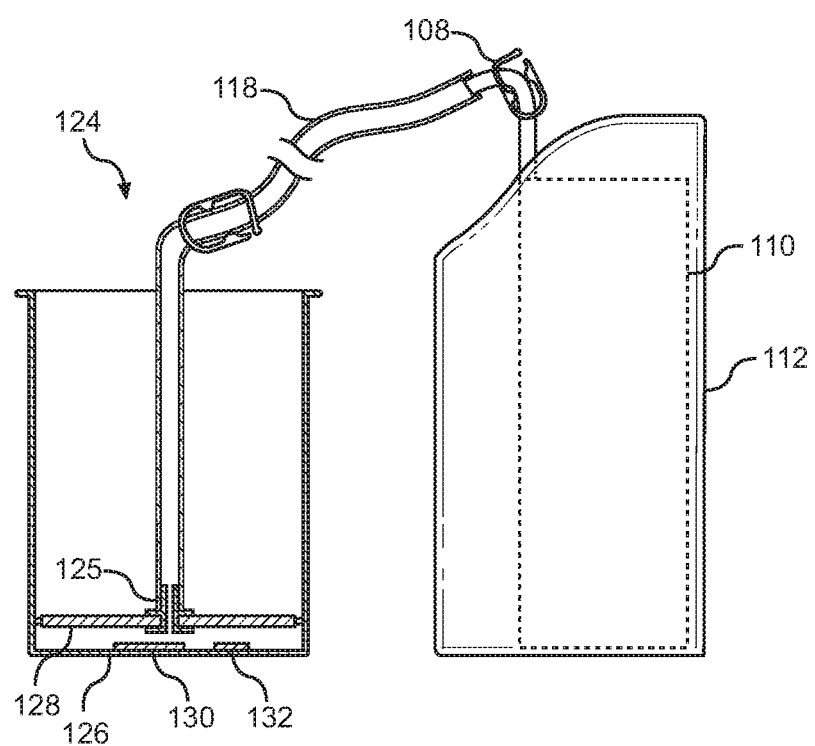

Another method for replenishing the bladder 14 could be by use of an inert gas production canister, such as that indicated at 60 in FIGS. 18 through 20D or that indicated at 124 in FIGS. 29A through 29C relative to an alternative embodiment of the invention. In such inert gas production canisters 60 and 124, ambient oxygen-rich air can be converted to oxygen-poor air, mainly nitrogen, by use of $CO_2$ and oxygen absorbing materials retained within the canister 60 or 124 and in communication with the open inner volume thereof. The resulting gas is thus a preservative gas that can be transferred to the bladder 14 for subsequent use pursuant to the disclosed method. It should be noted that it could be possible and is within the scope of the invention except as it might be expressly limited by the claims to combine the bladder 14 and the inert gas production canister capabilities by enabling the retention of $CO_2$ and oxygen absorbing materials in fluidic communication with the inner volume of the bladder 14. It should be further noted that use of the term production in the sense that the inert gas production canister 60 can yield or produce a volume of substantially inert gas from a volume of air.

The inert gas production canister 60 of FIGS. 18 through 20D has a resiliently compressible shell 62 that, in this embodiment, is ovoid in shape with truncated poles. In one practice of the invention, the shell 62 had a volume of approximately one liter, but the volume can vary depending on, among other things, the application at hand. The shell 62 has a rim 64 that sealingly engages a cap 66, such as by a gasketed and threaded connection therebetween. A valve connector 74 is retained by the cap 66 in fluidic communication with the inner volume of the shell 62. A capsule 70, which can be perforated or otherwise open to the inner volume of the shell 62, is removably and replaceably retained within the open inner volume of the shell 62. The capsule 70 has a first compartment retaining a volume of material 72, such as calcium hydroxide, with $CO_2$ absorbing capacity and a second compartment retaining a volume of material 73 with oxygen absorbing capacity, such as a mixture of iron powder and sodium chloride. The capsule 70 or multiple separate or combined capsules or packets can be disposed in the inner volume of the shell 62 in a fixed or a free-floating manner. The capsule 70 and, additionally or alternatively, the volumes of material 72 and 73 can be removed and replaced when the materials 72 and 74 are spent.

Figure 20A:
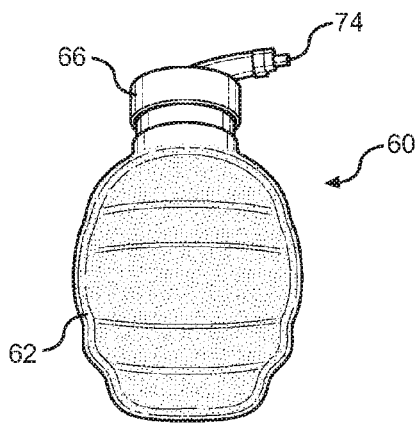
FIGS. 20A through 20D depict a series of steps in a process of producing and harvesting inert gas using an inert gas production canister.
Figure 20B:
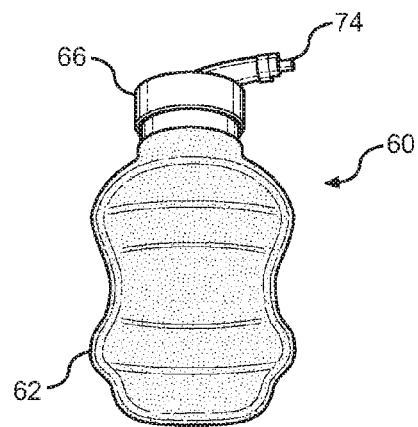
Figure 20C:
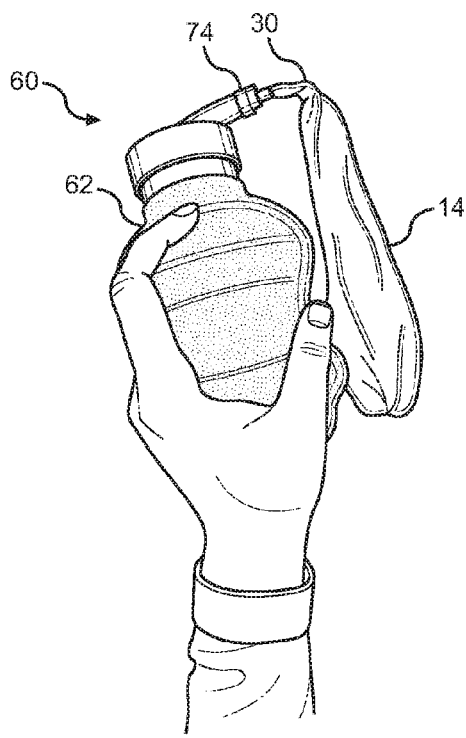
Figure 20D:
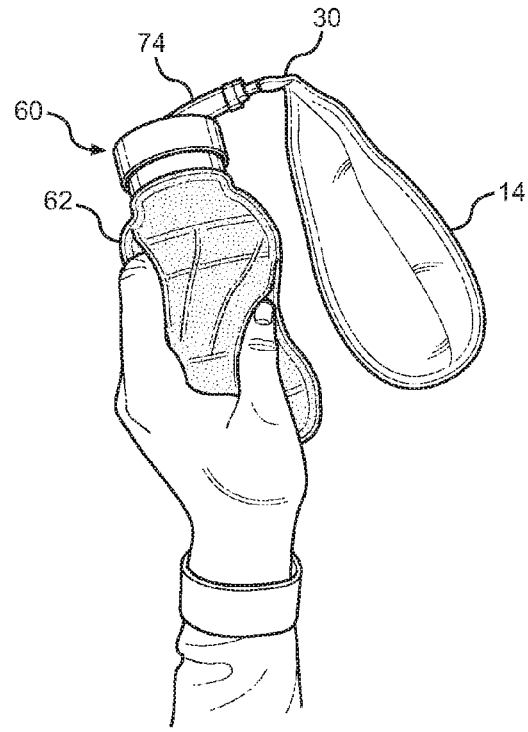

So configured, the inert gas production canister 60 can transform air retained in the inner volume of the shell 62 that is initially composed of, for example, 79% nitrogen, 20% oxygen, 0.5% argon, and 0.5% trace other gases into an environment mainly composed of nitrogen with a small percentage of argon and a very small volume of oxygen, such as 0.1% or less. After a given time period, such as approximately eight hours, the transformation results in a reduction in volume of the contained gases so that the shell 62 will naturally tend to compress from the initial condition shown in FIG. 20A to a partially compressed condition as illustrated in FIG. 20B. With the inner volume of the shell 62 now effectively forming a preservative gas comprised nearly entirely of nitrogen and argon, the valve connector 30 of the bladder 14 can be connected to the valve connector 74 of the inert gas production canister 60 and the bladder 14 can be filled with preservative gas by squeezing the shell 62. Once the bladder 14 is sufficiently filled, the valve connectors 30 and 74 can be disconnected thereby to close the valve connector 30 and seal the preservative gas in the bladder 14 pending use in the volumetric displacement method taught herein.

Figure 28:
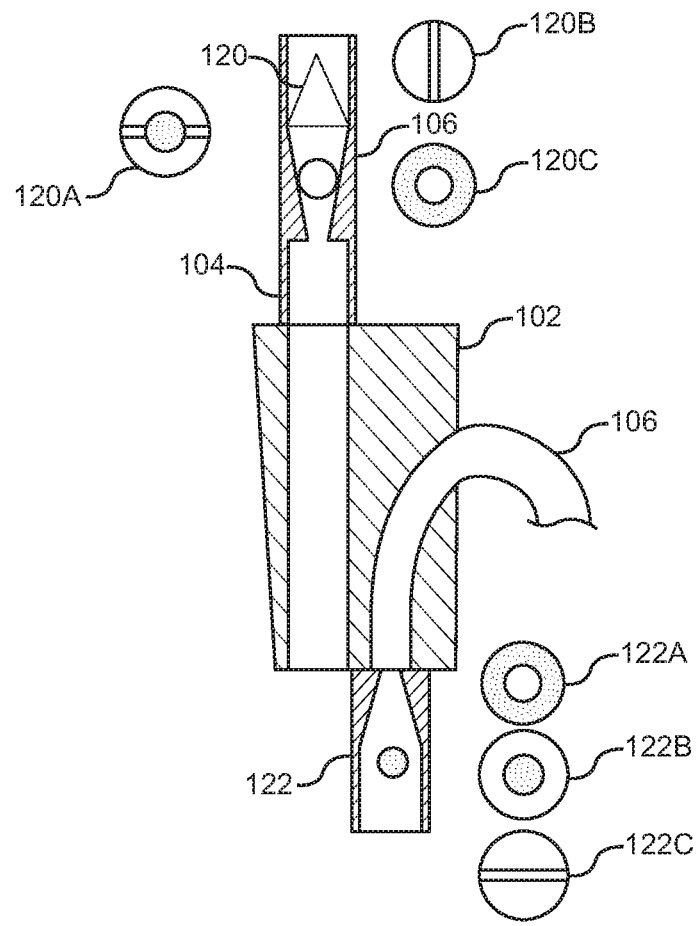
FIG. 28 is a longitudinal cross section of an alternative fluid exchange stopper according to the invention.

As noted previously, the volumetric displacement preservation system and method taught herein are subject to further embodiments within the scope of the invention. One such further volumetric displacement preservation system according to the invention is indicated generally at 100 in FIGS. 24A through 25C. There, the volumetric displacement preservation system 100 is again applied to a vessel 200, which again comprises a wine bottle 200. The volumetric displacement preservation system 100 has a stopper 102 with a fluidic exhaust pathway established by a first, fluid exhaust conduit 104 through the stopper 102 and a fluidic inlet pathway established by a second, fluid inlet conduit 106 through the stopper 102. The second conduit 106 establishing the fluidic inlet pathway is fluidically connected to an expandable and compressible bladder 110, such as by a flexible conduit 118, and a clamp 108 operates to selectively close the fluidic inlet pathway between the stopper 102 and the bladder 110. A cap 105, a clamp (not shown), a valve 120 as shown in FIG. 28, and, additionally or alternatively, any other mechanism can be used to selectively close the fluidic outlet pathway, such as during storage. A valve 122, which could be a one-way valve, can be disposed along the fluidic inlet pathway.

Figure 27:
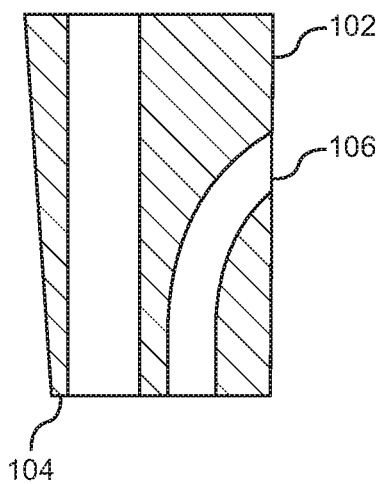
FIG. 27 is a longitudinal cross section of a fluid exchange stopper according to the invention.

Embodiments of the stopper 102 are shown alone in FIGS. 27 and 28. In the embodiment of FIG. 27, the stopper 102 merely has a longitudinal borehole forming the fluidic exhaust conduit 104 and a curved borehole forming the fluidic inlet conduit 106. In the embodiment of FIG. 28, the stopper 102 has the same longitudinal and curved boreholes, except that tubes pass therethrough to act as the fluidic exhaust conduit 104 and the fluidic inlet conduit 106. The cap 106 can be fixed or removable and can have a valve 120 retained retained thereby, and a valve 122 is retained along the fluidic pathway of the fluidic inlet conduit, such as at the base of the stopper 102. The valves 120 and 122 can be of a variety of types. For instance, the valves 120 and 122 can be check valves allowing fluid flow only in exhaust from the fluidic exhaust conduit 104 and only in incoming flow along the fluidic inlet conduit 106. The valve 120 could have lateral cross sections over its length as illustrated at 120A, 120B, and 120C, and the valve 122 could have lateral cross sections over its length as illustrated at 122A, 122B, and 122C. Either or both valves 120 and 122 can be removable to facilitate, for example, the reverse volumetric displacement process for harvesting preservative gas from the inner volume of the vessel 200.

The bladder 110 and the remainder of the volumetric displacement preservation system 100 could again be used in an unprotected fashion. However, the bladder 110 could be partially, substantially, or entirely enveloped in a protective shell 112 as seen, for instance, in FIGS. 24A through 24C. As before, the protective shell 112 can be retained in place relative to the volumetric displacement preservation system 100 in any effective manner, including but not limited to the illustrated first and second arcuate wings 114 and 116. The wings 114 and 116, which can be fixed or resilient, are fixed to the protective shell 112 to receive and engage the vessel 200. For instance, a wine bottle 200 could be slid longitudinally into engagement with the protective shell 112 and the wings 114 or 116, or the wings 114 or 116 could be outwardly biased and the wine bottle 200 inserted therebetween. With the protective shell 112 disposed to encase or envelop all or part of the bladder 110, inadvertent compression, displacement, or damage to the bladder 110 can be prevented.

Under this construction, a process for preserving the contents of a vessel 200 can be practiced. In this example, the original cork has been removed from the wine bottle 200 and the stopper 102 of the volumetric displacement preservation system 100 has been inserted in its stead. With the bladder 110 sufficiently filled with preservative gas, the vessel 200 can be disposed in a dispensing condition, such as by being tilted over a receiving vessel 204, and the cap 106 can be removed and the clamp 108 adjusted to an open condition. With that, the fluidic inlet and exhaust pathways will be opened. A volume of liquid 202 can then be exhausted, such as by the force of gravity, as progressively shown in FIGS. 25A through 25C. However, it will be appreciated that the application of a compressive pressure on the bladder 110 could additionally or alternatively be used to force preservative gas into the open inner volume of the vessel 200. As liquid 202 is passed from the inner volume of the vessel 200 through the fluidic exhaust pathway, preservative gas will pass into the inner volume of the vessel 200 from the bladder 110 in volumetric displacement. The bladder 110 progressively deflates as the volume of liquid 202 is dispensed as illustrated by the drawings. The inner volume of the vessel 200 will then retain the received volume of preservative gas in protection of the remaining contents of the vessel 200 against degradation. The cap 106 can be reapplied and the clamp 108 can be adjusted to a closed position, potentially during the dispensing of liquid 202 from the vessel 200 to prevent the introduction of ambient air into the inner volume of the vessel 200.

Figures 26A, 26B:
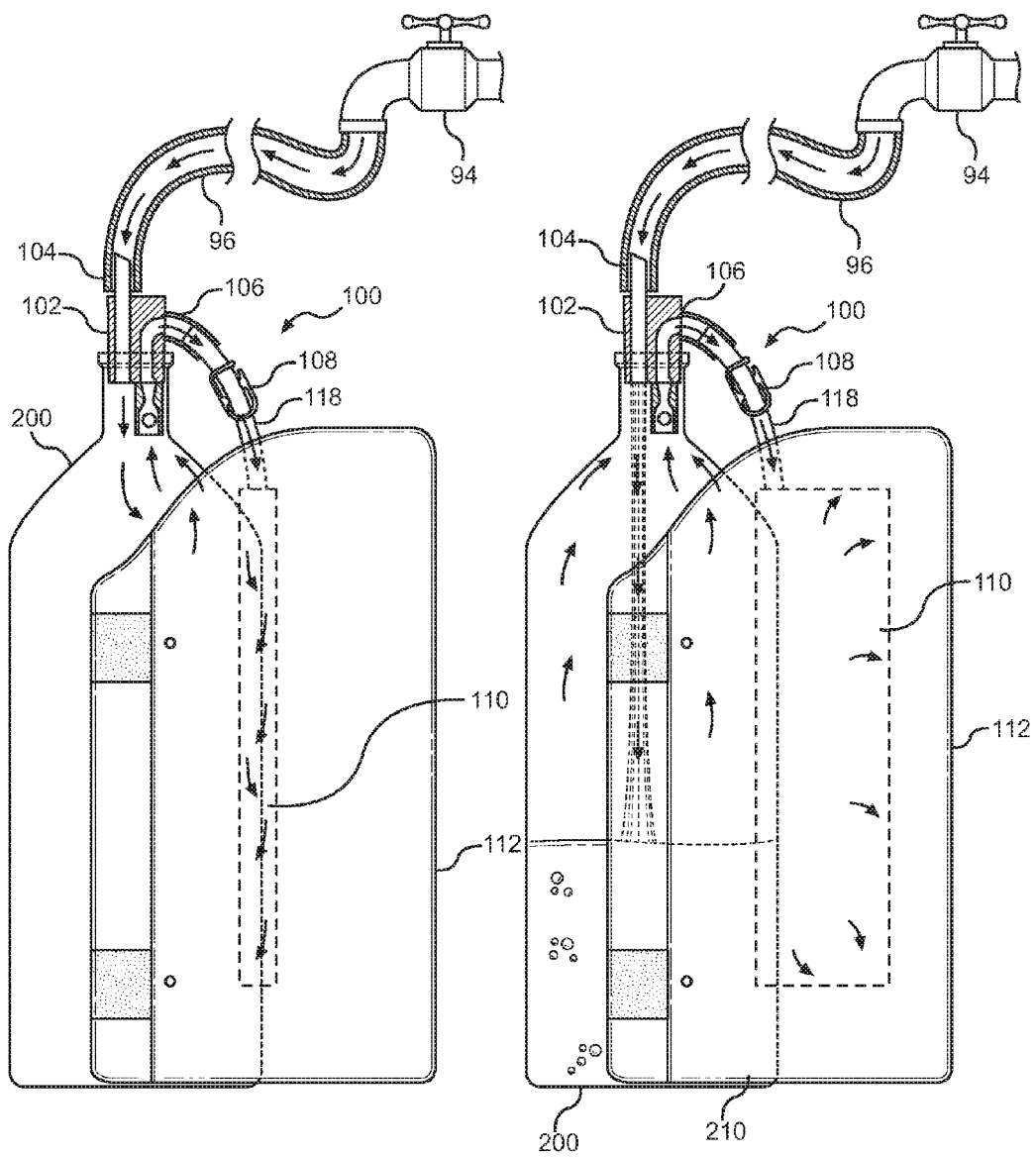
FIGS. 26A through 26C depict the preservation system of FIG. 24A during a series of steps in a process of gas retrieval by volumetric displacement.
Figure 26C:
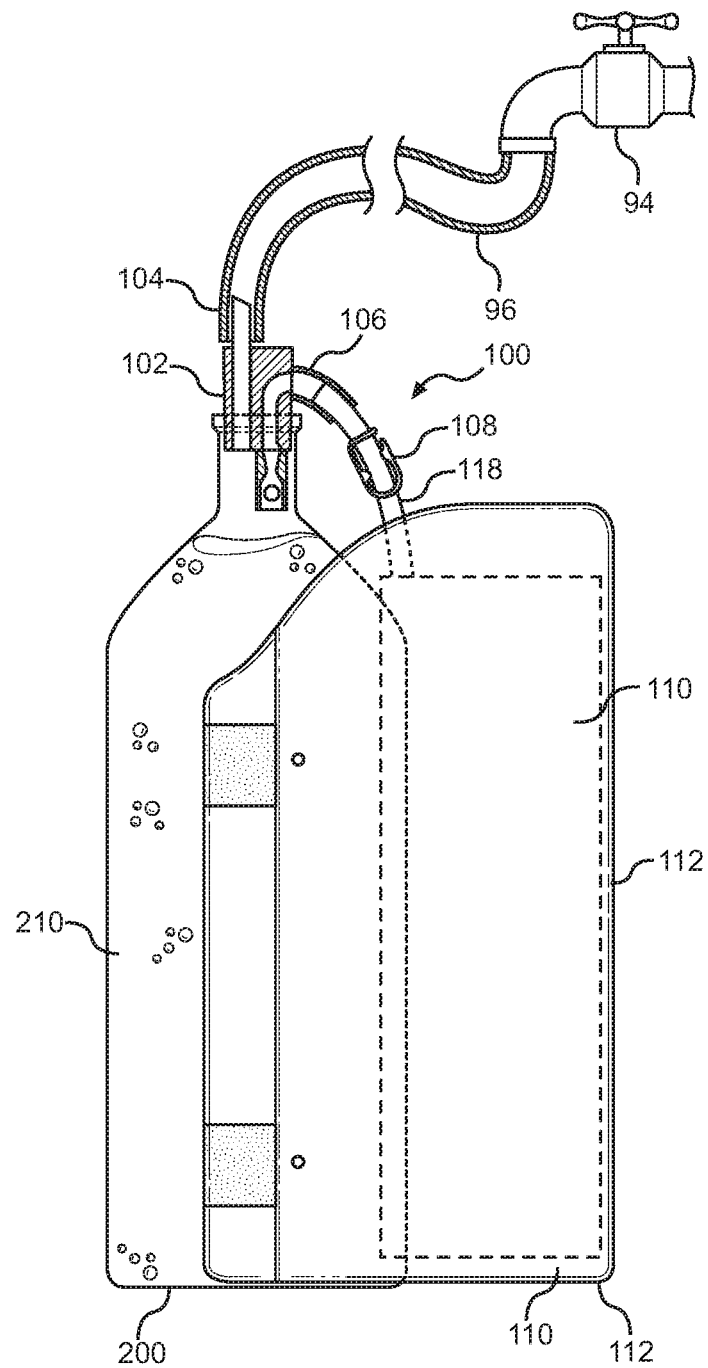

As with the earlier embodiment of the preservation system 10, the bladder 110 could be replenished or replaced when exhausted. As illustrated in FIGS. 26A through 26C, a reverse volumetric displacement process can again be employed to harvest preservative gas from the open inner volume of the bottle 200 and return it to the open inner volume of the bladder 110. To do so, the exhaust conduit 104 can be connected to a source of displacement liquid, such as water or any other liquid, by a conduit 96. While any source of displacement liquid could be employed, one illustrated source is a faucet 94, and another source could be a displacement vessel as illustrated and described previously holding a volume of displacement liquid. Displacement liquid 210 can be caused to flow into the inner volume of the vessel 200 through the exhaust conduit 96 and the fluidic exhaust pathway in communication therewith. The displacement liquid 210 could simply flow under the force of gravity, or it could be supplied under a given pressure. By volumetric displacement, the incoming displacement liquid 210 forces the preservative gas from within the inner volume of the vessel 200 back into the bladder 110. With that, the same preservative gas, or at least some portion thereof, can be reused.

The bladder 110 could again be partially or completely filled or replenished by use of an inert gas production canister, which could be as previously shown and described, as indicated generally at 124 in FIGS. 29A through 29C, or in some other form. In the embodiment of FIGS. 29A through 29C, ambient oxygen-rich air is again converted to oxygen-poor air, mainly nitrogen, by use of CO2 and oxygen absorbing materials retained within the canister 124 and in communication with the open inner volume thereof. The resulting gas is thus a preservative gas that can be transferred to the bladder 110 for subsequent use pursuant to the disclosed method.

The inert gas production canister 124 has a shell 126, which can be rigid, and a lid 128 that is sealingly engaged with the inner surface of the wall or walls of the shell 126 in a slidable manner whereby the inner volume of the canister 124 can be adjusted by a sliding of the lid 128 relative to the shell 126, much like a plunger in a syringe. The shell 126 and the lid 128 can have a variety of cross-sectional shapes, including round, square, or some other shape. A fluidic connector 125 is retained by the lid 128 in fluidic communication with the inner volume of the shell 126. A volume of material 130, such as calcium hydroxide, with CO2 absorbing capacity can be retained in the inner volume of the shell 126, and a volume of material 132 with oxygen absorbing capacity, such as a mixture of iron powder and sodium chloride, can also be retained in the inner volume of the shell 126. The materials 130 and 132 can be disposed in the inner volume of the shell 126 in a fixed or a free-floating manner, and the materials 130 and 132 can be replaced when spent.

It will again be understood that numerous other embodiments of the canister 124 are possible. By way of example and not limitation, other canisters could be expand and contract in a bellows construction or any other preferably expandable and compressible construction. Moreover, the canister 124 can be of any suitable volume. It will be noted, though, that the canister 124 should have a volume larger than the desired resulting volume of preservative gas since the volume of oxygen in the initially present air will be lost. For example, to make 800 milliliters of preservative gas, a 1000 milliliter canister 124 is required since approximately 200 milliliters of volume will be lost as oxygen is removed from the air.

So configured, the inert gas production canister 124 can transform air retained in the inner volume of the shell 126 that is initially composed of, for example, 79% nitrogen, 20% oxygen, 0.5% argon, and 0.5% trace other gases into an environment mainly composed of nitrogen with a small percentage of argon and a very small volume of oxygen, such as 0.1% or less. After a given time period, the transformation results in a reduction in volume of the contained gases so that the shell 126 will naturally tend to compress from the initial condition shown in FIG. 29A to a partially compressed condition. With the inner volume of the shell 126 now effectively forming a preservative gas comprised nearly entirely of nitrogen and argon, the fluidic connector 125 can be connected to the fluidic conduit 118 and, through it, to the bladder 110. The bladder 110 can be filled with preservative gas by pressing on the lid 128 to reduce the volume within the canister 124. Once the bladder 110 is sufficiently filled, the clamp 108 can be closed to seal the preservative gas in the bladder 110 pending use in the volumetric displacement method taught herein.

In each embodiment of the volumetric displacement preservation system 10 and 100 disclosed, a symbiosis is thus created between the vessel 200 and the system 10 or 100 to enhance the consuming experience. Where wine is the substance to be preserved, for example, the components cooperate to help the wine drinker pour and decant the wine 202 as it pours out of the dispensing nozzle 36 or the fluid exhaust conduit 104. The fluidic exhaust pathway so established is narrow enough to exhaust a narrow stream of wine from the bottle 200 to start the decanting process of wine instantly. Moreover, wine passing through the separate conduit joining passageways 48A and 48B and then joined to pass through the nozzle 36 of the fluidic exchange valve 32 will be further aerated to be placed in optimal drinking condition. Still further, the tip of the dispensing nozzle 36 or the exhaust conduit 104 can have a beveled edge to prevent dripping.

As described above, once exhausted of preservative gas, the expandable and compressible bladder 14 could be refilled with preservative gas for subsequent usage by a number of methods. For instance, the reverse volumetric displacement process of FIG. 23 could be employed to harvest preservative gas from the inner volume of a vessel 200 whose liquid contents have been dispensed and volumetrically replaced by preservative gas. It would also possible to use a compressed gas supply 76 with a compressed gas cylinder 86 containing a volume of preservative gas as suggested in FIGS. 21A and 21B. Additionally disclosed above are systems and methods for replenishing the bladder 14 could be by use of an preservative gas production canister external to the bladder 14. Such external preservative gas production canisters are, for example, indicated at 60 in FIGS. 18 through 20D or that indicated at 124 in FIGS. 29A through 29C.

Figure 30:
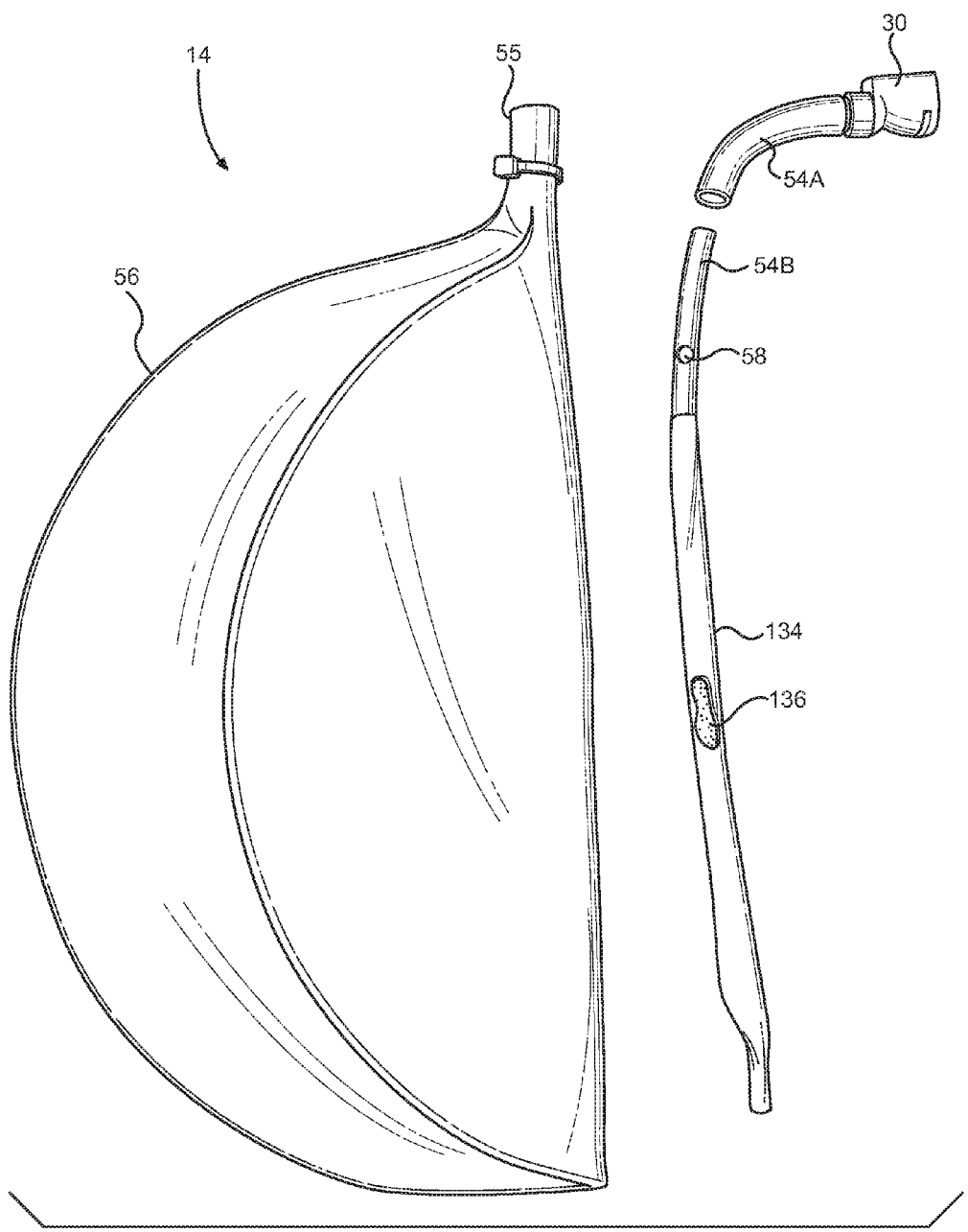
FIG. 30 is a view in front elevation of an external preservative supply bladder according to the invention with an inert gas harvesting member as taught herein.

The foregoing systems and methods are certainly viable and effective. However, the inventor has further appreciated that it could be advantageous if the preservative gas production or harvesting capabilities were incorporated internally within the expandable and compressible bladder 14 itself. Such a bladder 14 is depicted in FIG. 30 in a partially disassembled form. There, the bladder 14 is again founded on a shell 56, which can be of a flexible and substantially gas impermeable material. As previously described, numerous such materials are possible, each within the scope of the invention. By way of a nonrestrictive example, the shell 56 of the bladder 14 can be a polymeric material with or without a lining layer and could take the form of a foil with polymeric material and an aluminum lining.

The shell 56 is sealed but for an orifice 55. A tube structure is formed by first and second tubes 54A and 54B. The first tube 54A in this embodiment has an arcuate portion and has a proximal end and a distal end, and the second tube 54B in this example is generally straight. A valve coupling 30 is disposed to the distal end of the first tube 54A, and the proximal end of the first tube 54A can be selectively engaged with the distal end of the second tube 54B. For example, the tubes 54A and 54B can have inner and outer diameters chosen to permit a substantially sealed arrangement to be achieved therebetween with the distal end of the second tube 54B matingly received into the proximal end of the first tube 54A as shown, for instance, in FIG. 31. Where the tubes 54A and 54B are so disposed and configured, an annular shoulder 138 will thus be established where the tube structure transitions from the narrower outside diameter of the second tube 54B to the larger outside diameter of the first tube 54A.

One or more apertures 58 can be disposed along the tube structure formed by the first and second tubes 54A and 54B to facilitate gas flow. In this example, the aperture or apertures 58 are disposed adjacent to the proximal end of the second tube 54B. With this, the valve coupling 30 and a valve coupling 28 (as in FIGS. 2B and 3B, for instance) can be in fluidic communication with the inner volume of the bladder 14 even where the distal end of the second tube 54B is plugged. Again, the valve coupling 30 can have an automatically sealed condition when not engaged with the valve coupling 28 of the fluid exchange structure 12 and an automatically bidirectionally open condition when engaged with the valve coupling 28.

Figure 34:
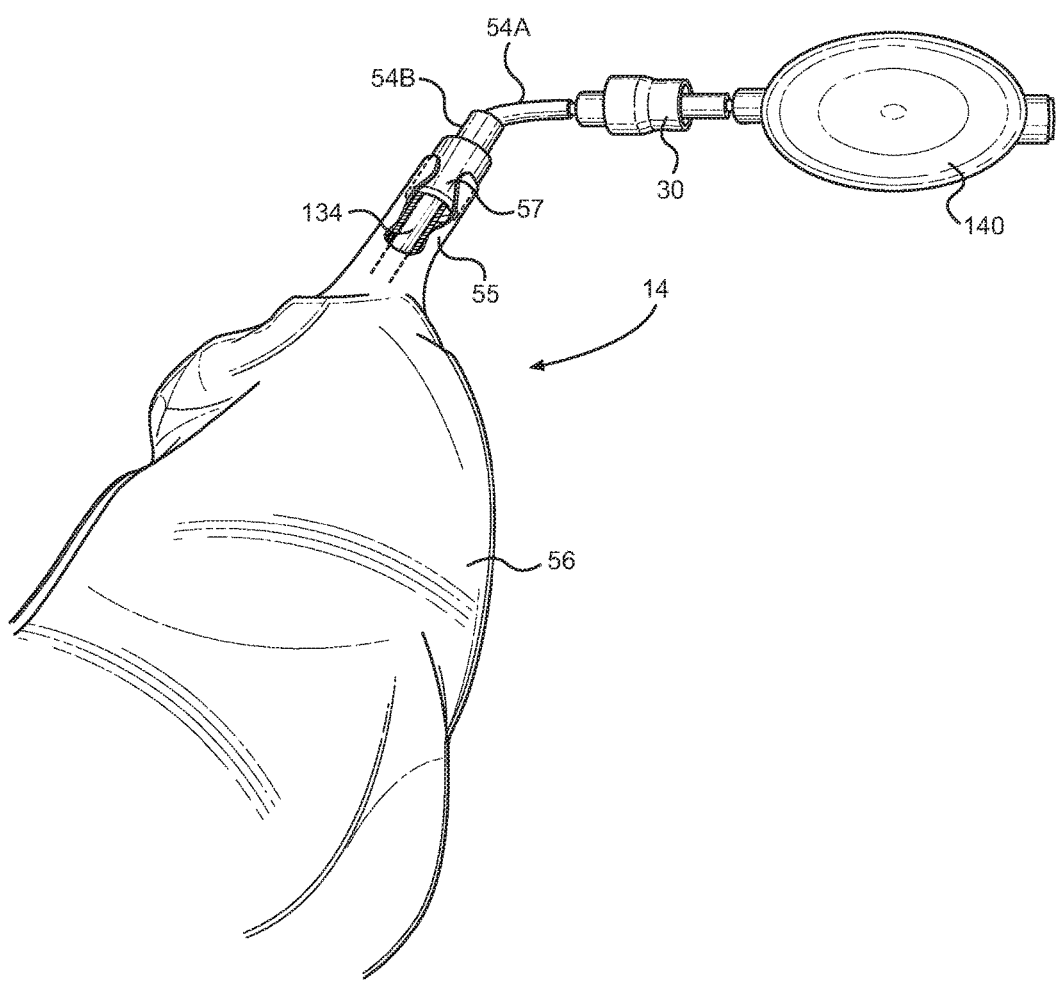
FIG. 34 is a perspective view of the external preservative supply bladder with an inert gas harvesting member during a filling with air.

One or more preservative gas production members 134 can be selectively inserted into and, potentially, removed from the inner volume of the bladder 14. With such a preservative gas production member 134 inserted directly into the inner volume of the bladder 14, the bladder 14 can simply be filled with a volume of ambient oxygen-rich air, and that air can be converted to oxygen-poor air, mainly nitrogen, by use of $CO_2$ and/or oxygen absorbing materials forming all or part of the inter gas production member 134. With sufficient time and $CO_2$ and/or oxygen absorbing material, the resulting gas within the bladder 14 will thus be a preservative gas that can be used pursuant to the disclosed method. The bladder 14 can be filled with air in any effective manner. For example, as FIG. 34 shows, the bladder 14 could be inflated with ambient air by a simple manual air pump 140, in this case a squeeze-bulb pump, or any other type of filling mechanism.

The preservative gas production member 134 could, by way of example, retain a volume of material 136 with $CO_2$ absorbing capacity, such as calcium hydroxide and, additionally or alternatively, a volume of material 136 with oxygen absorbing capacity, such as oxygen-absorbing iron or a mixture of iron powder and sodium chloride. It would be possible for the preservative gas production member 134 or multiple separate or combined members to be disposed in the inner volume of the bladder 14 in a fixed or a free-floating manner. If necessary or desirable, the preservative gas production member or members 134 can be removed and replaced when the materials are spent.

So configured, the preservative gas production member 134 can transform air retained in the inner volume of the bladder 14 that is initially composed of, for example, 79% nitrogen, 20% oxygen, 0.5% argon, and 0.5% trace other gases into an environment mainly composed of nitrogen with a small percentage of argon and a very small volume of oxygen, such as 0.1% or less. After a given time period, such as approximately eighteen hours in one practice of the invention, the transformation results in a reduction in volume of the contained gases so that the bladder 14 will naturally tend to compress from the initial condition to a partially compressed condition. Losses of volume of approximately 20% have been exhibited. The inner volume of the bladder 14 will thus retain a preservative gas comprised nearly entirely of nitrogen and argon pending use in the volumetric displacement method taught herein.

Figure 31:
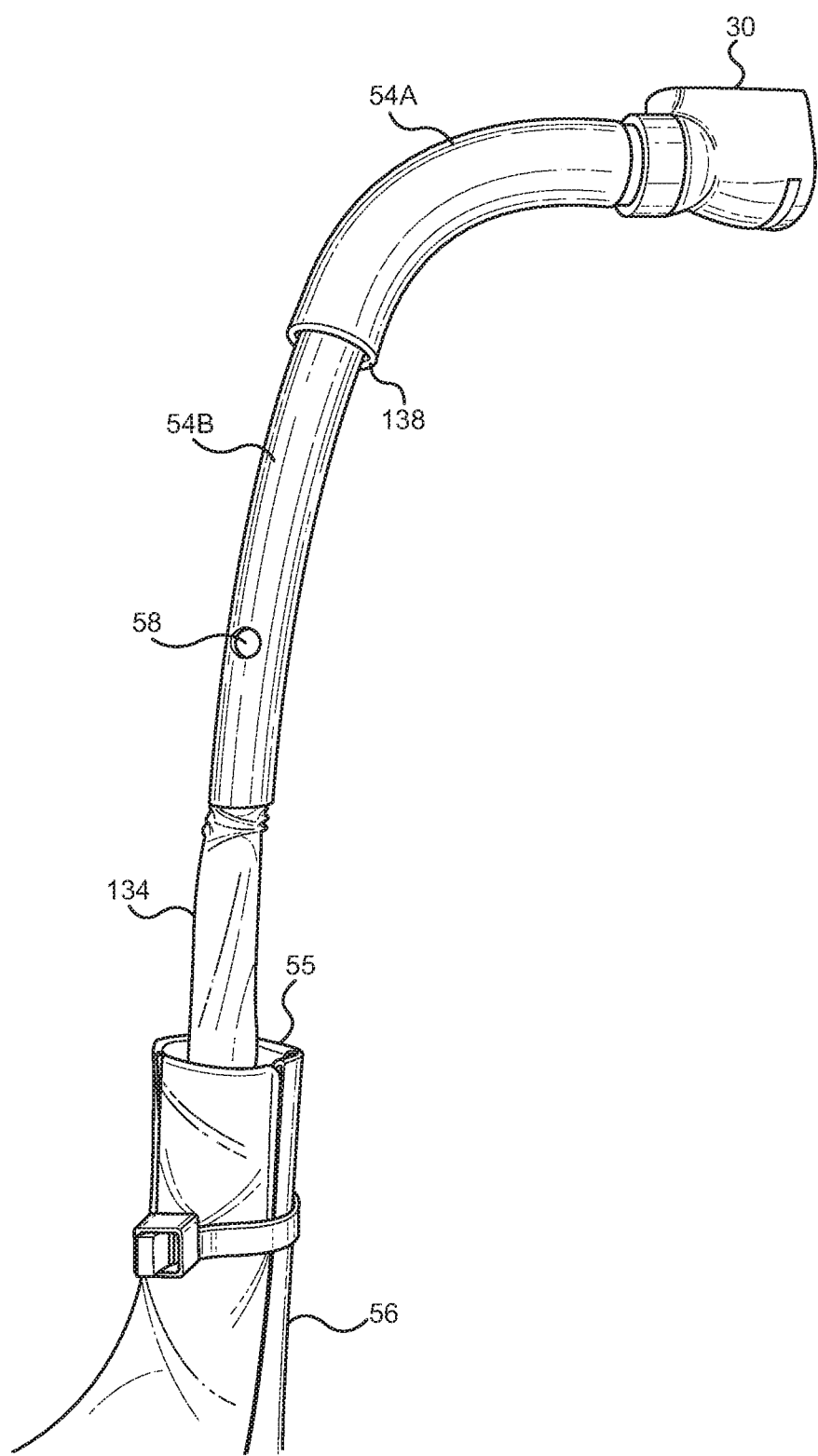
FIG. 31 is an amplified view in front elevation of a distal portion of the external preservative supply bladder with an inert gas harvesting member of FIG. 30.
Figure 33:
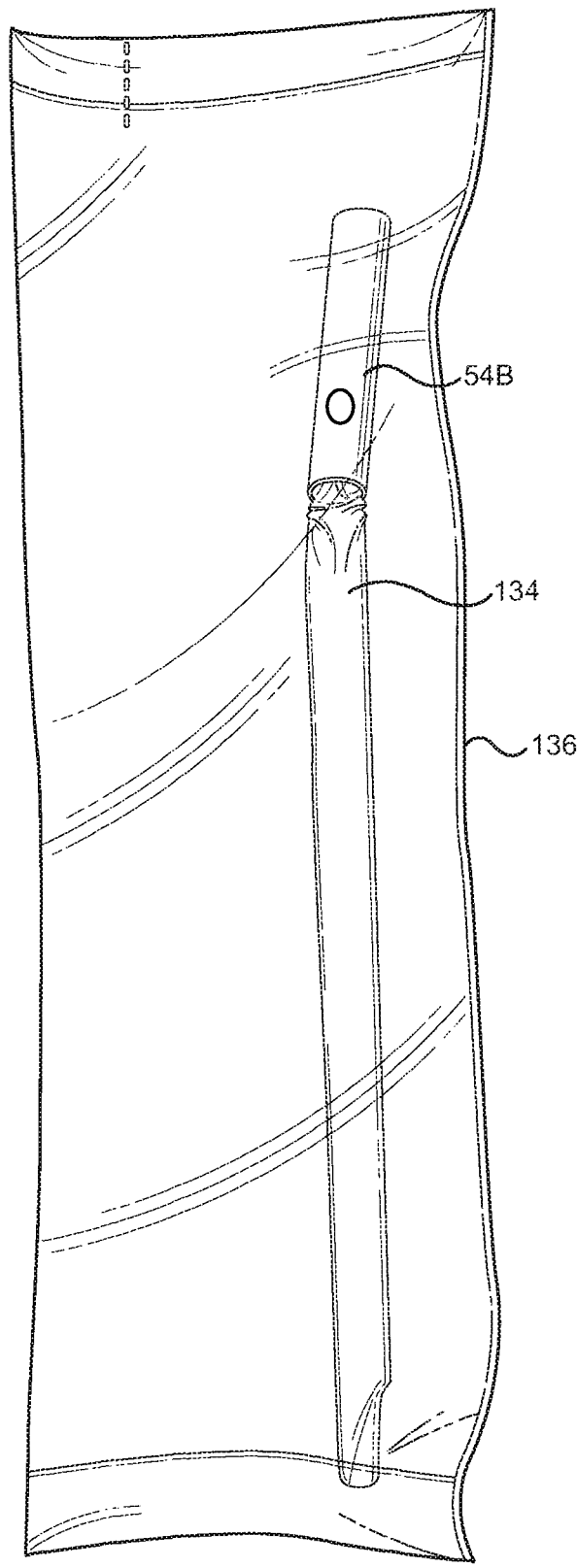
FIG. 33 is a view in front elevation of the inert gas harvesting member in sealed packaging.

In the present embodiment, the preservative gas production member 134 comprises an elongate member that is generally rod-like in shape. The preservative gas production member 134 has an effective diameter sized to be received through the orifice 55 in the bladder 14 and sized to be received into the proximal end of the second tube 55B in an interference fit. With this, the preservative gas production member 134 can be engaged with the proximal end of the second tube 55B as is depicted in FIG. 31, for instance, and the preservative gas production member 134 and the proximal end of the second tube 55B can be inserted through the orifice 55 and into the inner volume of the bladder 14. The preservative gas production member 134 could, in certain examples of the invention, be formed with a sleeve of, for example, thin lamina, paper, or plastic capable of freely allowing gas exchange between the chemical substance or substances inside the sleeve and the inner volume of the bladder 14. In practice, such preservative gas production members 134 can be stored pending use in a vacuum-sealed sleeve 136 as is shown, for instance, in FIG. 33.

Figure 32:
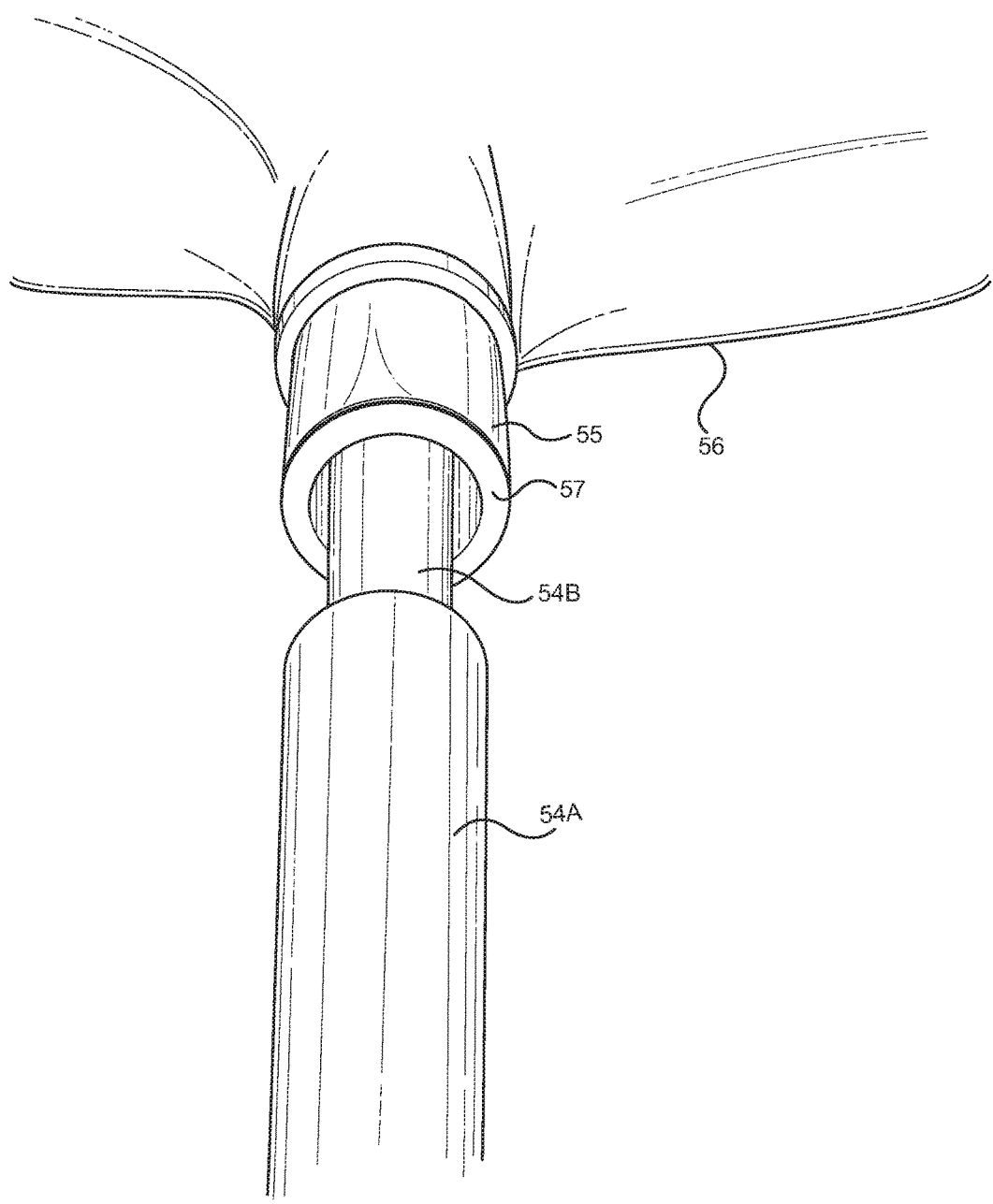
FIG. 32 is an amplified perspective view of a distal portion of the external preservative supply bladder with an inert gas harvesting member showing engagement between the first and second tubes and the collar of the orifice of the supply bladder.

As seen in FIG. 32, for instance, the orifice 55 of the bladder 14 can have a collar 57. The collar 57 can have an inner diameter sized to produce an interference fit between the collar 57 and the outer diameter of the first tube 54A. With that, the preservative gas production member 134 and the proximal portion of the second tube 55B can be slid through the orifice 55 and into the inner volume of the bladder 14, and the proximal portion of the first tube 54A can be received into the collar 57 in a substantially sealed relationship. With the preservative gas production member 134 so disposed, simple ambient air can be converted to a volume of gas mainly composed of nitrogen with a small percentage of argon and a very small volume of oxygen, and the bladder 14 can be used in the preservative process disclosed herein. When desired, such as when some or all of the preservative gas has been dispensed into a bottle 200, the spent preservative gas production member 134 can be removed and replaced simply by pulling the tube structure formed by the first and second tubes 54A and 55B from the collar 57, removing the preservative gas production member 134 from the proximal end of the second tube 55B, and inserting a new preservative gas production member 134 to permit a repetition of the process. It would also be possible to use the bladder 14 just shown and described to replenish a deflated second bladder (not shown) with preservative gas.

Yet another structure of a bladder for use in the volumetric displacement process disclosed herein is indicated generally at 14 in FIGS. 35A through 35D. There, the bladder 14 again defines an open inner volume for retaining a volume of gas. The bladder 14 is again sealed but for the orifice 55. Here, however, the bladder 14 is defined by a wall structure with at least one flexible portion 56A that can expand and contract or collapse and at least one substantially rigid portion 56B that resists contracting or collapsing. The flexible and rigid portions 56A and 56B could be formed from any airtight materials. For example, the flexible portion 56A could be of a polymeric and foil layered material, and the rigid portion 56B could be formed from metal, plastic, or any other suitable material or combination of materials.

In the depicted embodiment, the flexible and rigid portions 56A and 56B each comprise roughly one-half of the overall bladder shape, which of course could vary widely within the scope of the invention. In this example, the rigid portion 56B forms a bulbous rigid shell portion that includes the orifice 55, and the flexible portion 56A, when expanded, forms a bulbous flexible shell portion. The flexible and rigid portions 56A and 56B are mutually sealed along their edges to define a sealed inner volume.

Figure 35A:
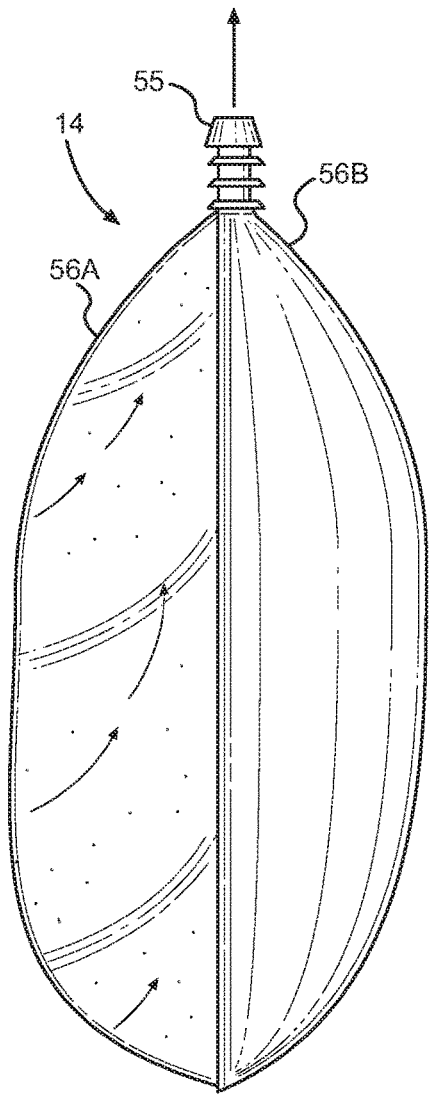
FIGS. 35A through 35D depict an alternative external preservative supply bladder in sequential stages of deflation.
Figure 35B:
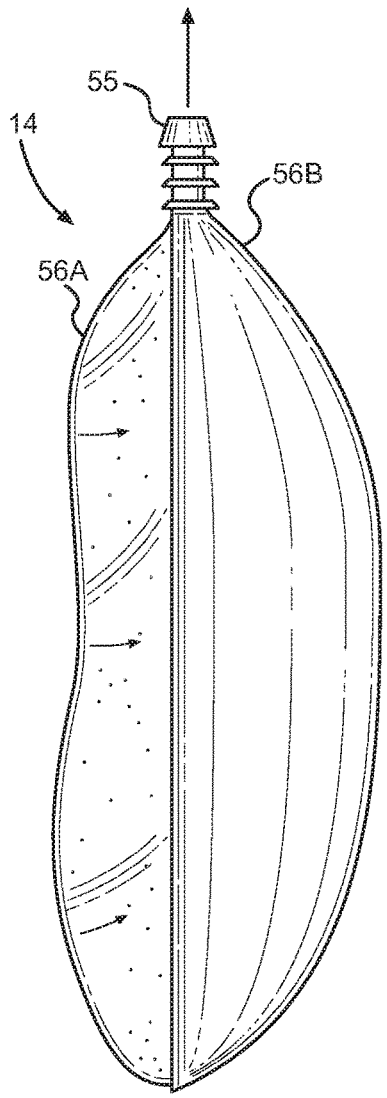
Figure 35C:
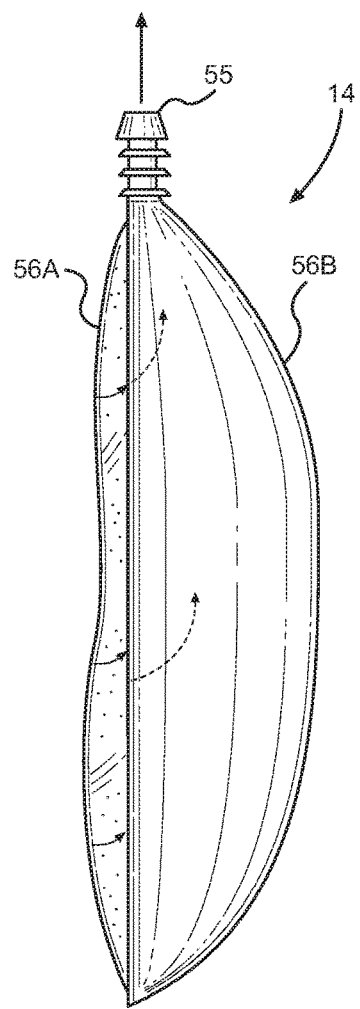
Figure 35D:
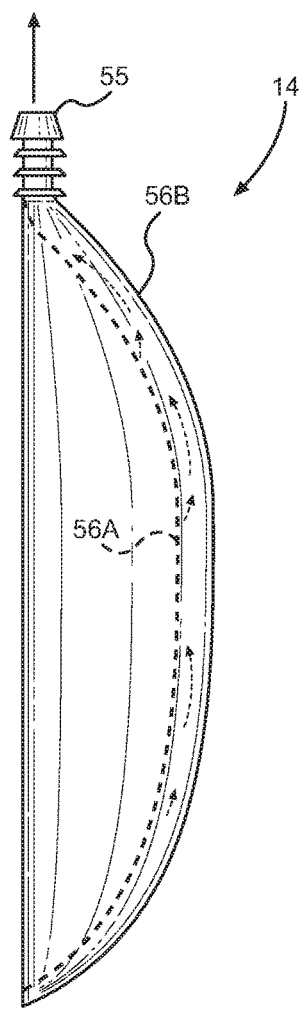

With a bladder 14 formed with such flexible and rigid portions 56A and 56B, the bladder 14 can transition between the inflated state of FIG. 35A and the substantially deflated state of FIG. 35B. As the bladder 14 undergoes deflation, for example, the flexible portion 56A will begin as a bulbous shape as in FIG. 35A so that the flexible and rigid portions 56A and 56B will generally correspond in shape. With progressive degrees of deflation of the bladder 14, the rigid portion 56B will retain its shape, but the flexible portion 56A will tend to collapse toward the rigid portion 56B through the progressively collapsed configurations of FIGS. 35B and 35C to the substantially collapsed configuration of FIG. 35D where the flexible portion 56A has bowed in to the concavity of the rigid portion 56B.

Figure 36:
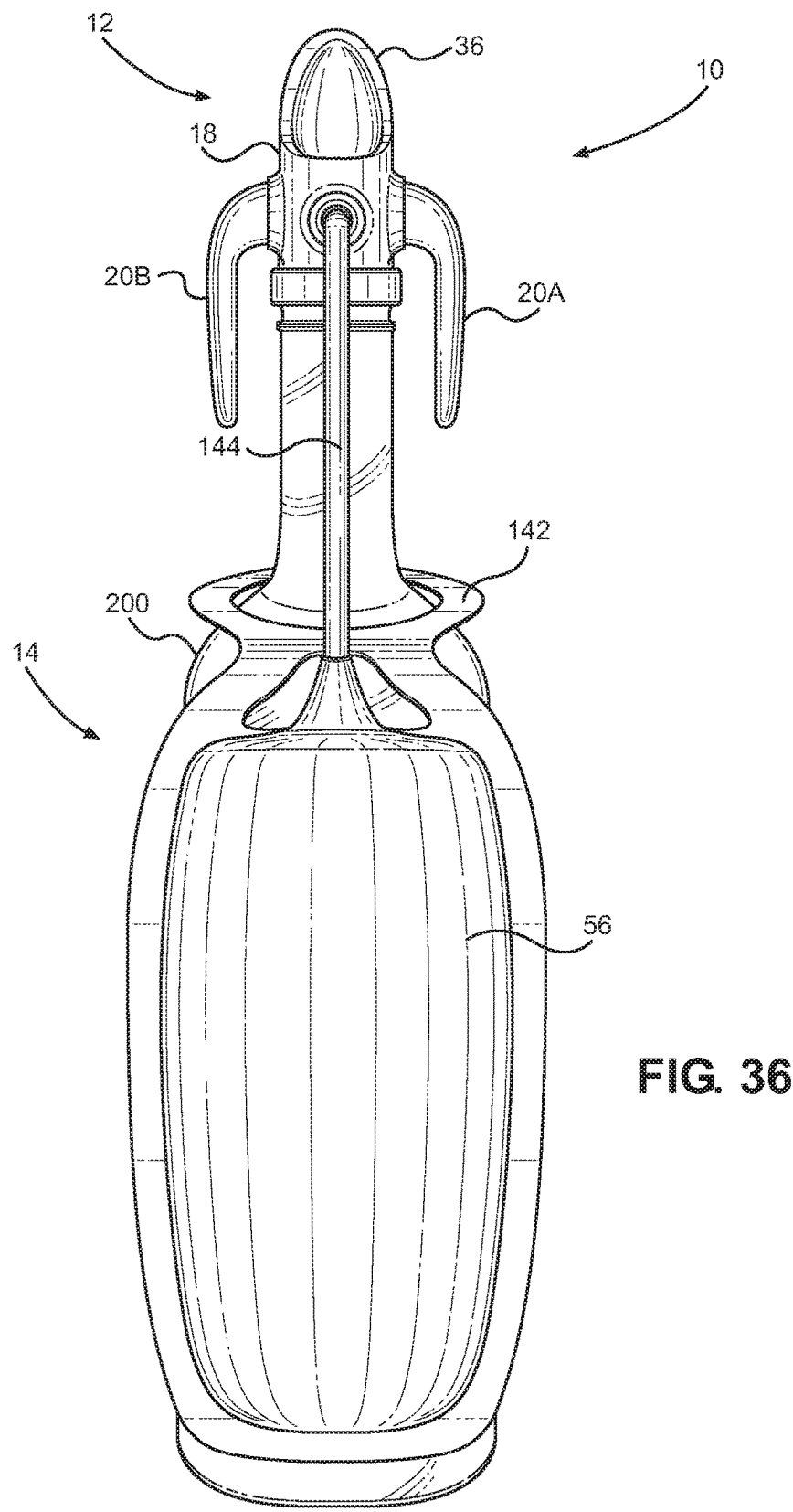
FIG. 36 is a view in front elevation of another volumetric displacement preservation system according to the invention with an alternative external preservative supply bladder and an alternative fluid exchange structure.
Figure 37:
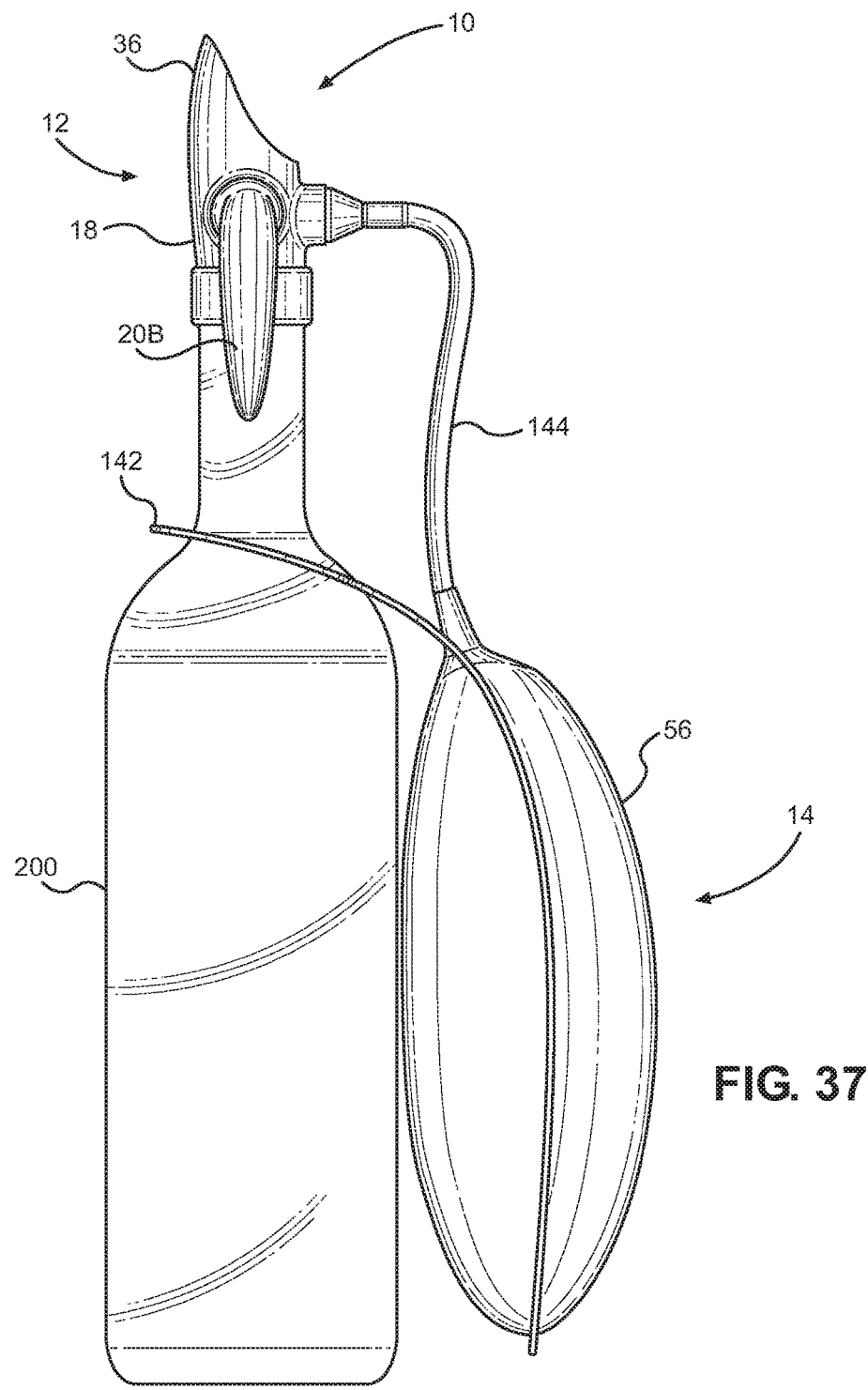
FIG. 37 is a view in side elevation of the volumetric displacement preservation system of FIG. 36.
Figure 38:
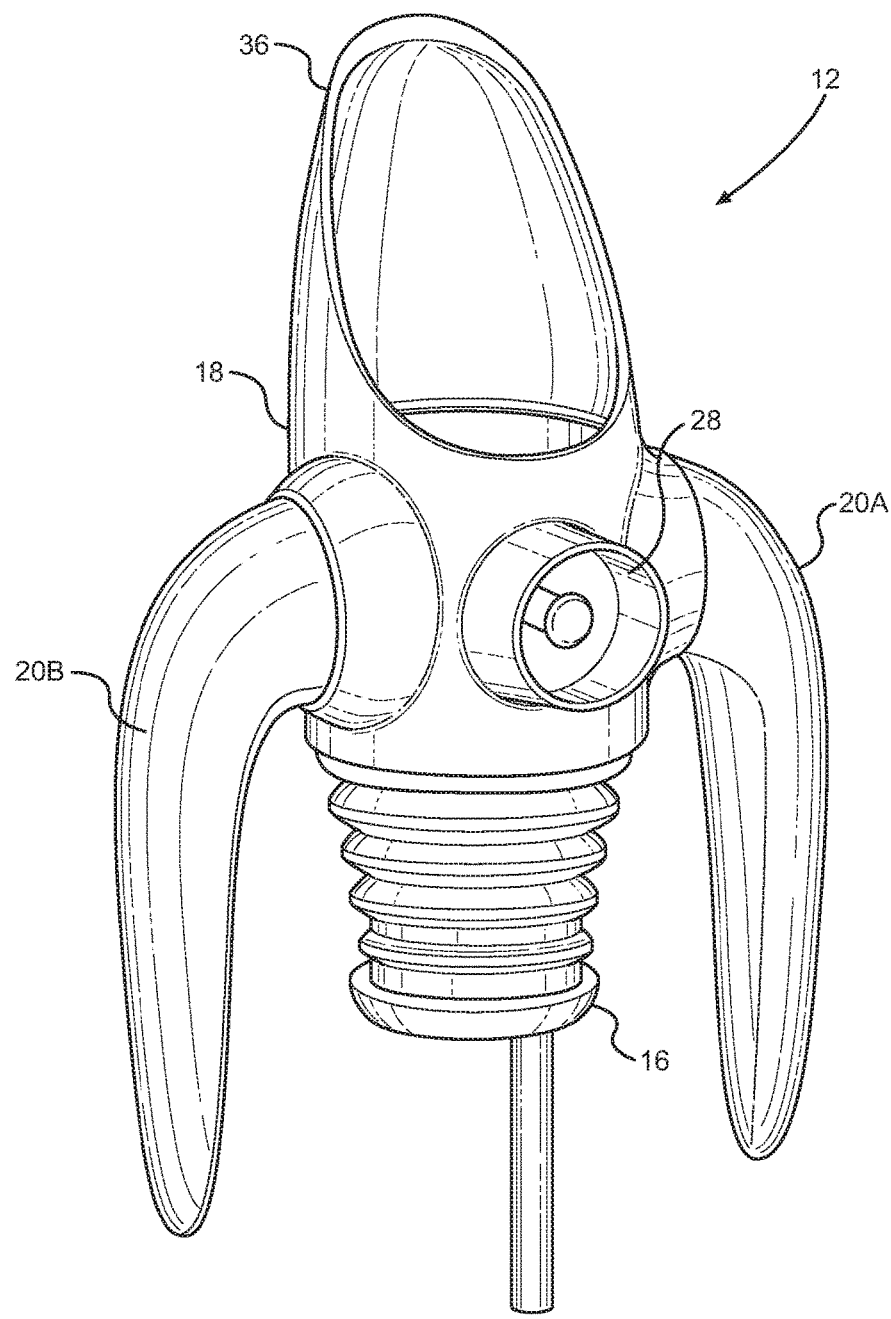
FIG. 38 is a perspective view of the fluid exchange structure of FIG. 36.

An alternative embodiment of the volumetric displacement system 10 is shown in FIGS. 36 and 37, and the fluid exchange structure 12 thereof is shown apart in FIG. 38. There, the fluid exchange structure 12 again selectively and, potentially in a substantially simultaneous event, establishes and closes the inlet and exhaust pathways previously described. The fluid exchange structure 12 again has a stopper 16 with a plurality of annular sealing ridges 22 therealong that cooperate to create a sealing engagement with the vessel 200 and a head portion 18 accessible from external to the vessel 200. The fluid exchange structure 12 has a dispensing nozzle 36 that projects longitudinally to be aligned with the neck of the bottle 200. In a manner as shown and described previously, the fluid exchange structure 12 is operable by a pivoting of either or both of first and second lever arms 20A and 20B.

The lever arms 20A and 20B are substantially equal in size and shape with each having a smooth, arcuate shape that tapers to a tip. With this, the arms 20A and 20B are operative as stabilizing legs when in an orthogonal position. With that, a bottle 200 or other vessel can be stably rested on a support surface with the arms 20A and 20B cooperating to support the upper end of the bottle 200. Each arm 20A and 20B can have a length from its pivot axis to its distal end calibrated to correspond to the radius of the base of a typical wine bottle 200 such that the bottle 200 could be retained horizontally or at some desired angle of incline or decline.

Preservative gas is again supplied to the inner volume of the vessel 200 during a dispensing of liquid 202 from an expandable and compressible bladder 14. The bladder 14 is founded on a shell 56 of a flexible and substantially gas impermeable material as described previously. Here, however, the bladder 14 is fluidically coupled to the fluid exchange structure 12 by an elongate tube 144 such that the shell 56 of the bladder is spaced from the fluid exchange structure. The bladder 14 has a collar portion 142 secured to the shell 56. The collar portion 142 can thus be employed to surround the bottle 200 thereby to assist in retaining the bladder 14 in place. The collar portion 142 can comprise a disc or other ring of material and could include an inner volume for retaining air or produced preservative gas. For example, all or a portion of the shell 56 could be incorporated into an annular shape to form the collar portion 142 with the shell 56 potentially having, for example, a torroidal shape or a sleeve or jacket with an inner volume. The collar portion 142 is illustrated in FIGS. 36 and 37 as comprising a simple ring.

With certain details and embodiments of the present invention for systems and method for the preservation of wine and other substances disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, any such claims shall be construed to cover not only the corresponding structure and material expressly described in this specification but also all equivalents thereof.

I claim as deserving the protection of Letters Patent:

1. A volumetric displacement preservation system for preserving a volume of flowable substance in an open inner volume of a vessel, the volumetric displacement preservation system comprising:
   a fluid exchange structure with a stopper for creating a sealing engagement with the vessel;
   a fluid exhaust pathway in the fluid exchange structure with a first end to be in fluidic communication with the open inner volume of the vessel and a second end to be in fluidic communication exterior to the vessel when the stopper is engaged with the vessel wherein the fluid exhaust pathway has an open condition where fluid can pass through the fluid exhaust pathway and a closed condition where fluid substantially cannot pass through the fluid exhaust pathway;
   a fluid inlet pathway in the fluid exchange structure with a first end to be in fluidic communication with the open inner volume of the vessel and a second end to be in fluidic communication exterior to the vessel when the stopper is engaged with the vessel wherein the fluid inlet pathway has an open condition where fluid can pass through the fluid inlet pathway and a closed condition where fluid substantially cannot pass through the fluid inlet pathway;
   a chamber with an expandable and compressible inner volume for retaining a volume of preservative gas and an orifice for dispensing the preservative gas from the chamber;
   a preservative gas production member disposed in the chamber to remove oxygen from air in the chamber to produce a preservative gas, wherein the preservative gas production member comprises a volume of material with oxygen absorbing capacity; and
   a fluidic connection for fluidically connecting the orifice of the chamber to the second end of the fluid inlet pathway so that the chamber is retained externally to the open inner volume of the vessel;
   whereby, when the fluid exhaust pathway and the fluid inlet pathway are in closed conditions, fluid cannot be exhausted through the fluid exhaust pathway and fluid cannot be received through the fluid inlet pathway and whereby, when the fluid exhaust pathway and the fluid inlet pathway are in open positions, liquid can be dispensed from the open inner volume of the vessel through the fluid exhaust pathway and preservative gas can be drawn from the chamber and into the open inner volume of the vessel through the fluid inlet pathway in volumetric displacement of the liquid exhausted through the fluid exhaust pathway.

2. The volumetric displacement preservation system of claim 1 wherein the volume of material of the preservative gas production member comprises oxygen-absorbing iron.

3. The volumetric displacement preservation system of claim 1 wherein the preservative gas production member comprises an elongate, substantially rod-like member.

4. The volumetric displacement preservation system of claim 1 wherein the preservative gas production member has an effective diameter sized to be received through the orifice in the chamber.

5. The volumetric displacement preservation system of claim 4 further comprising a tube structure with a proximal portion for being selectively received through the orifice of the chamber and a distal portion with a valve coupling.

6. The volumetric displacement preservation system of claim 5 wherein the preservative gas production member can be selectively retained by the proximal portion of the tube structure.

7. The volumetric displacement preservation system of claim 6 wherein the orifice of the chamber has a collar and wherein the distal portion of the tube structure is sized to be received in the collar in a sealing engagement.

8. The volumetric displacement preservation system of claim 7 wherein the preservative gas production member has a portion sized to be received into the proximal portion of the tube structure.

9. The volumetric displacement preservation system of claim 8 further comprising at least one aperture in the tube structure.

10. The volumetric displacement preservation system of claim 9 wherein the at least one aperture is disposed in the proximal portion of the tube structure.

11. The volumetric displacement preservation system of claim 1 wherein the chamber comprises a bladder with at least a flexible portion.

12. The volumetric displacement preservation system of claim 11 wherein the bladder has a substantially rigid portion.

13. The volumetric displacement preservation system of claim 1 wherein the chamber is compressible from an initial condition to a compressed condition and wherein the chamber has an orifice and further comprising a valve structure in fluidic communication with the inner volume of the chamber wherein the valve structure can be opened to permit gas to be dispensed from the inner volume of the chamber and closed to prevent gas from being dispensed from the inner volume of the chamber and a tube structure with a proximal portion for being selectively received through the orifice of the chamber and into the inner volume of the chamber and a distal portion wherein the preservative gas production member is sized to be received through the orifice in the chamber, wherein the valve structure is retained by the distal portion of the tube structure, and wherein the preservative gas production member can be selectively retained by the proximal portion of the tube structure within the inner volume of the chamber.

14. The volumetric displacement preservation system of claim 13 wherein the volume of material of the preservative gas production member comprises oxygen-absorbing iron.

15. The volumetric displacement preservation system of claim 13 wherein the preservative gas production member comprises an elongate, substantially rod-like member.

16. The volumetric displacement preservation system of claim 15 wherein the preservative gas production member has an effective diameter sized to be received through the orifice in the chamber.

17. The volumetric displacement preservation system of claim 13 wherein the orifice of the chamber has a collar, wherein the distal portion of the tube structure is sized to be received in the collar in a sealing engagement, and wherein the proximal portion of the tube structure extends into the inner volume of the chamber beyond the collar.

18. The volumetric displacement preservation system of claim 17 wherein the preservative gas production member has a portion sized to be received into the proximal portion of the tube structure.

19. The volumetric displacement preservation system of claim 18 further comprising at least one aperture in the tube structure.

20. A method for volumetric displacement preservation for preserving a volume of flowable substance in an open inner volume of a vessel, the method for volumetric displacement preservation comprising:

providing a vessel with an open inner volume retaining a volume of flowable substance;

providing a fluid exchange structure with a stopper for creating a sealing engagement with the vessel;

providing a fluid exhaust pathway with a first end to be in fluidic communication with the open inner volume of the vessel and a second end to be in fluidic communication exterior to the vessel when the stopper is engaged with the vessel wherein the fluid exhaust pathway has an open condition where fluid can pass through the fluid exhaust pathway and a closed condition where fluid substantially cannot pass through the fluid exhaust pathway;

providing a fluid inlet pathway with a first end to be in fluidic communication with the open inner volume of the vessel and a second end to be in fluidic communication exterior to the vessel when the stopper is engaged with the vessel wherein the fluid inlet pathway has an open condition where fluid can pass through the fluid inlet pathway and a closed condition where fluid substantially cannot pass through the fluid inlet pathway;

providing a chamber with an inner volume retaining a volume of preservative gas and an orifice for dispensing the preservative gas from the chamber;

providing a preservative gas production member disposed in the chamber to replenish the chamber by removing oxygen from air in the chamber to produce a preservative gas, wherein the preservative gas production member comprises a volume of material with oxygen absorbing capacity;

providing a fluidic connection for fluidically connecting the orifice of the chamber to the second end of the fluid inlet pathway;

applying the stopper to the vessel;

connecting the orifice of the chamber to the second end of the fluid inlet pathway;

disposing the vessel in a dispensing condition;

disposing the fluid exhaust pathway and the fluid inlet pathway in open conditions;

dispensing a volume of the flowable substance from the open inner volume of the vessel through the fluid exhaust pathway and simultaneously drawing a volume of preservative gas into the open inner volume of the vessel through the fluid inlet pathway in volumetric displacement of the liquid exhausted through the fluid exhaust pathway;

disposing a volume of air in the chamber;

disposing the preservative gas production member in the chamber to remove oxygen from air in the chamber to produce a preservative gas.

21. The method for volumetric displacement preservation of claim 20 wherein the preservative gas production member can be selectively retained by the proximal portion of the tube structure.

* * * * *